United States Patent [19]

Tait et al.

[11] Patent Number: 4,476,011

[45] Date of Patent: Oct. 9, 1984

[54] CATALYST AND PROCESS FOR THE HYDROGENITROGENATION AND HYDROCRACKING OF HIGH-NITROGEN FEEDS

[75] Inventors: A. Martin Tait; Thomas D. Nevitt, both of Naperville, Ill.; Albert L. Hensley, Jr., Munster, Ind.

[73] Assignee: Standard Oil Company (Indiana), Chicago, Ill.

[21] Appl. No.: 369,844

[22] Filed: Apr. 19, 1982

Related U.S. Application Data

[63] Continuation-in-part of Ser. No. 200,536, Oct. 24, 1980.

[51] Int. Cl.$^3$ .................. C10G 47/16; C10G 47/20
[52] U.S. Cl. .............................. 208/111; 208/110; 208/216 R; 208/254 H
[58] Field of Search ............... 208/111, 216 R, 254 H, 208/110

[56] References Cited

U.S. PATENT DOCUMENTS

| | | | |
|---|---|---|---|
| 3,929,620 | 12/1975 | Parthasarathy et al. | 208/111 |
| 4,008,149 | 2/1977 | Itoh et al. | 208/216 PP |
| 4,054,539 | 10/1977 | Hensley, Jr. | 208/111 X |
| 4,077,909 | 3/1978 | Bertolacini et al. | 208/138 X |
| 4,120,825 | 10/1978 | Ward | 252/455 Z |
| 4,153,540 | 5/1979 | Gorring et al. | 208/89 |
| 4,181,602 | 1/1980 | Quick et al. | 208/216 PP |
| 4,218,308 | 8/1980 | Itoh et al. | 208/143 |
| 4,224,144 | 9/1980 | Hensley, Jr. et al. | 208/216 PP |
| 4,268,420 | 5/1981 | Klotz | 252/432 |
| 4,428,862 | 1/1984 | Ward et al. | 502/77 |
| 4,431,518 | 2/1984 | Angevine et al. | 208/111 |
| 4,431,527 | 2/1984 | Miller et al. | 208/254 H |
| 4,434,047 | 2/1984 | Hensley, Jr. et al. | 208/111 |

FOREIGN PATENT DOCUMENTS 1436458 5/1976 United Kingdom .

Primary Examiner—Delbert E. Gantz
Assistant Examiner—O. Chaudhuri
Attorney, Agent, or Firm—James L. Wilson; William T. McClain; William H. Magidson

[57] ABSTRACT

There is disclosed a catalyst, which catalyst comprises a hydrogenation component comprising chromium, molybdenum, and at least one metal of Group VIII, a crystalline molecular sieve zeolite, and a porous refractory inorganic oxide. Suitable molecular sieve zeolites are those having pore diameters of at least 5 Å (0.5 nm) and containing exchangeable cations, for example, faujasite crystalline aluminosilicates, mordenite crystalline aluminosilicates, ZSM crystalline aluminosilicates, and AMS crystalline metallosilicates.

There are also disclosed processes for the hydrodenitrogenation and hydrocracking of a hydrocarbon stream containing a substantial amount of nitrogen compounds, which processes comprise contacting said stream under suitable conditions and in the presence of hydrogen with the aforesaid catalyst.

37 Claims, No Drawings

CATALYST AND PROCESS FOR THE HYDROGENITROGENATION AND HYDROCRACKING OF HIGH-NITROGEN FEEDS

CROSS-REFERENCES TO RELATED APPLICATIONS

This application is a continuation-in-part application of co-pending application U.S. Ser. No. 200,536, which was filed in the U.S. Patent and Trademark Office on Oct. 24, 1980.

U.S. Ser. No. 200,536 was filed concurrently with and is co-pending with U.S. Ser. No. 200,544, now abandoned, which discloses the hydrotreating of nitrogen-containing feeds in the presence of a catalyst comprising a hydrogenation component comprising chromium, molybdenum, and at least one metal of Group VIII and an alumina-silica support, which support contains silica in an amount within the range of about 10 wt% to about 50 wt%, based upon the weight of the catalyst support.

BACKGROUND OF THE INVENTION

This invention is related to the catalytic hydrotreatment of a feedstock containing large concentrations of nitrogen compounds in the presence of hydrogen to hydrocrack said feedstock and to remove nitrogen compounds therefrom.

In U.S. Pat. No. 2,971,904, Gladrow, et al., disclose various processes, such as hydroforming, cracking, and hydroisomerization, which processes employ a catalyst comprising a hydrogenation component, such as molybdenum, chromium, tungsten, vanadium, platinum group metals, nickel, copper, cobalt, cobalt molybdate, and mixtures thereof, deposited upon a zeolitic crystalline aluminosilicate molecular sieve.

In U.S. Pat. No. 3,236,761, Rabo, et al., consider processes for cracking, hydrocracking, polymerization, alkylation, dealkylation, reforming, and isomerization of hydrocarbons, which processes employ a zeolitic molecular sieve catalyst. The zeolitic molecular sieve has less than 90 percent of the aluminum atoms associated with cations and is identified as a decationized zeolitic molecular sieve. The silicon dioxide to aluminum trioxide molar ratio of this molecular sieve is greater than 3. While the preferred metals are palladium and platinum, other catalytically active metals, such as titanium, chromium, molybdenum, tungsten, rhenium, manganese, zinc, and vanadium can be introduced into the crystalline aluminosilicate by any method.

In U.S. Pat. No. 3,236,762, Rabo, et al., disclose a process for the conversion of hydrocarbons, which process comprises contacting the hydrocarbons with a zeolitic molecular sieve having at least 40 percent of the aluminum tetrahedra satisfied by the presence of polyvalent metal cations. Metals such as palladium, platinum, titanium, chromium, molybdenum, tungsten, rhenium, manganese, zinc, and vanadium can be introduced into the crystalline aluminosilicate by any method which will result in dispersing the catalytically active metal. This patent discloses processes for isomerization, reforming, hydrocracking, alkylation, and dealkylation.

In U.S. Pat. No. 2,882,244, Milton discloses X-type crystalline zeolitic molecular sieves.

In U.S. Pat. No. 2,962,435, Fleck, et al., disclose the improved conversion of feedstocks that are contaminated with certain organic nitrogen compounds by employing a catalyst comprising a synthetic zeolitic metallo aluminosilicate which has been activated by partial dehydration. Such aluminosilicate has pores of at least 7 Å in diameter. Such process and catalyst are particularly useful for the catalytic cracking of hydrocarbon mixtures containing certain organic nitrogen compounds.

In U.S. Pat. No. 3,130,006, Rabo, et al., disclose a decationized zeolitic molecular sieve having a silicon dioxide to aluminum trioxide molar ratio greater than about 3.0 and a pore size that is sufficient to absorb benzene, and a metal-cation-to-aluminum atomic ratio of less than about 0.9, less than 90 percent of the aluminum atoms being associated with cations. Examples of such zeolites are faujasite, Y-type, and L-type molecular sieves.

In U.S. Pat. No. 3,130,007, Breck discloses crystalline Zeolite Y. This molecular sieve has a silicon dioxide to aluminum trioxide molar ratio that is greater than 3 and up to about 6.

In U.S. Pat. No. 3,013,988, Bukata, et al., disclose zeolitic molecular sieves containing at least one metal selected from the group consisting of chromium, molybdenum, and tungsten or oxides of these metals. The crystalline metal aluminosilicate zeolite can be a Zeolite X, Zeolite Y, and faujasite.

In U.S. Pat. No. 3,140,322, Frilette, et al., disclose a process for selectively conducting an organic chemical reaction, which process employs a crystalline aluminosilicate zeolite molecular sieve material of the X-type and A-type. The sodium or calcium ions of the zeolite may be replaced by such metal ions as lithium, magnesium, potassium, silver, strontium, nickel, cobalt, iron, zinc, mercury, cadmium, gold, scandium, titanium, vanadium, chromium, manganese, tungsten, yttrium, zirconium, niobium, molybdenum, hafnium, tantalum, aluminum, and other ions, such as ammonium and hydrogen ions. This patent teaches general methods for converting chemical substances catalytically under conditions which impose selectivity of reaction paths by virtue of providing catalytically active sites within crystalline substances, the interstitial dimensions of which will selectively pass or reject certain molecules. Examples of such reactions are dehydration of normal butanol, cracking of normal paraffins, and hydrogenation of double-bond or aromatic bond units.

In United Kingdom Patent Specification No. 731,638, there is disclosed a method for preparing a reforming catalyst, which catalyst consists of a major proportion of alumina (50 wt% to 89 wt%), a minor proportion of chromia (10 wt% to 30 wt%), and a minor proportion of molybdena (1 wt% to 20 wt%). This United Kingdom patent teaches that such a catalyst provides improved selectivity, activity, and stability for the reforming of hydrocarbon streams.

In U.S. Pat. No. 4,188,284, Quick, et al., disclose a process for the hydrotreating of a heavy hydrocarbon stream wherein said stream is contacted under suitable conditions and in the presence of hydrogen with a catalyst comprising a hydrogenating component consisting essentially of (1) molybdenum and chromium, (2) their oxides, (3) their sulfides, or (4) mixtures thereof on a large-pore, catalytically active alumina, said molybdenum being present within the range of about 5 wt% to about 15 wt%, calculated as $MoO_3$ and based upon the total catalyst weight, said chromium being present in an amount within the range of about 5 wt% to about 20 wt%, calculated as $Cr_2O_3$ and based upon the total catalyst weight, and said catalyst having a pore volume within the range of about 0.4 cc/gm to about 0.8 cc/gm, a surface area within the range of about 150 $m^2$/gm to about 300 $m^2$/gm, and an average pore diameter within the range of about 100 Å to about 200 Å.

In U.S. Pat. No. 4,181,602, Quick, et al., disclose a process for the hydrotreating of a heavy hydrocarbon stream wherein said stream is contacted under suitable conditions and in the presence of hydrogen with a catalyst comprising (1) the metals of molybdenum, chromium, and cobalt, (2) their oxides, (3) their sulfides, or (4) mixtures thereof on a large-pore, catalytically active alumina, said molybdenum being present in an amount within the range of about 5 wt% to about 15 wt%, calculated as $MoO_3$ and based upon the total catalyst weight, said chromium being present in an amount within the range of about 5 wt% to about 20 wt%, calculated as $Cr_2O_3$ and based upon the total catalyst weight, said cobalt being present in an amount within the range of about 0.1 wt% to about 5 wt%, calculated as CoO and based upon the total catalyst weight, and said catalyst possessing a pore volume within the range of about 0.4 cc/gm to about 0.8 cc/gm, a surface area within the range of about 150 $m^2$/gm to about 300 $m^2$/gm, and an average pore diameter within the range of about 100 Å to about 200 Å.

In U.S. Pat. No. 4,191,635, Quick, et al., disclose a process for the hydrotreating and cracking of a heavy hydrocarbon stream containing metals, asphaltenes, nitrogen compounds, and sulfur compounds, which process comprises hydrotreating the stream in the presence of a catalyst comprising molybdenum and chromium, and optionally cobalt, on a large-pore alumina to provide a hydrotreated product and catalytically cracking at least a portion of the hydrotreated product.

In U.S. Pat. No. 4,153,540, Gorring, et al., disclose a process for the treating of shale oil, wherein the shale oil is first hydrotreated to convert sulfur, nitrogen, and oxygen derivatives to hydrogen sulfides, ammonia, and water and the hydrotreated material is hydrocracked over a catalyst comprising a zeolite such as HZSM-5 and a hydrogenation/dehydrogenation metal.

In U.S. Pat. No. 4,224,144, Hensley, Jr., et al., disclose the hydrotreating of a hydrocarbon stream to remove nitrogen and sulfur therefrom, which stream is selected from petroleum hydrocarbon distillates, tar sands distillates, and shale oil. The catalyst employed in this hydrotreating process is a catalyst comprising a hydrogenation component comprising chromium, molybdenum, and a Group VIII metal deposited upon a porous refractory inorganic oxide support or carrier, such as alumina, silica-alumina, silica, magnesia, zirconia, and similar materials.

Now there has been found a catalyst which can be used to hydrodenitrogenate and hydrocrack successfully petroleum hydrocarbon distillates, liquids obtained from coal, liquids obtained from tar sands, and shale oil.

SUMMARY OF THE INVENTION

There is provided a catalytic composition and a process for the hydrodenitrogenation and hydrocracking of a hydrocarbon stream containing a substantial amount of nitrogen compounds, which process employs the aforesaid catalytic composition.

The catalyst comprises a hydrogenation component, a porous refractory inorganic oxide, and a crystalline molecular sieve zeolite, said hydrogenation component comprising chromium, molybdenum, and at least one Group VIII metal. The hydrogenation component can be deposed upon a support of the molecular sieve zeolite and refractory inorganic oxide. Alternatively, the hydrogenation component can be deposed upon the refractory inorganic oxide, which is physically mixed with the molecular sieve zeolite. A suitable molecular sieve zeolite is one having exchangeable cations and pore openings that are at least 5 Angstrom units (Å) (0.5 nm). Consequently, a suitable molecular sieve material is a member selected from the group consisting of a faujasite-type crystalline aluminosilicate, a mordenite-type crystalline aluminosilicate, a ZSM-type crystalline aluminosilicate, and an AMS-type crystalline metallosilicate. The molecular sieve zeolite is present in an amount within the range of about 5 wt% to about 90 wt%, based upon the weight of said support, and the metals of said hydrogenation component are present in the elemental form, as oxides, as sulfides, or as mixtures thereof. Typical examples of suitable molecular sieves are ultrastable, large-pore crystalline aluminosilicate material, a crystalline Y-type aluminosilicate, a ZSM-5 crystalline aluminosilicate, and an AMS-1B crystalline borosilicate.

There is provided also a process which comprises contacting a heavy hydrocarbon stream containing a substantial amount of nitrogen compounds under suitable conditions and in the presence of hydrogen with the aforesaid catalyst to produce motor fuel components, heater oil components, and a feedstock for a catalytic cracking unit.

DETAILED DESCRIPTION OF THE INVENTION

The present invention is directed to a novel catalyst and to a novel process employing that catalyst, which process is a process for the hydrodenitrogenation and hydrocracking of a hydrocarbon stream containing a substantial amount of nitrogen compounds.

The catalyst and the process of the present invention can be used conveniently to treat a hydrocarbon stream containing a substantial amount of nitrogen compounds. The phrase "containing a substantial amount of nitrogen compounds" refers to an amount that will result in at least 0.2 wt% nitrogen in the particular stream. Such hydrocarbon streams are selected from the group consisting of petroleum hydrocarbon distillates, liquids derived from coal, liquids derived from tar sands, and shale oil. Typical examples of petroleum hydrocarbon distillates are light virgin gas oils, heavy vacuum gas oils, heavy coker gas oils, and full range gas oils. Hydrocarbon streams derived from oil shale can be a whole shale oil or any fraction thereof. Such feedstocks often contain from about 0.2 wt% nitrogen to about 3.0 wt% nitrogen, or more.

Such hydrocarbon feeds contain substantial quantities of nitrogen compounds and such nitrogen compounds must be removed therefrom before the hydrocarbons can be used for fuels. One way of removing such nitrogen compounds comprises the hydrodenitrogenating of the hydrocarbon stream in the presence of hydrogen, under suitable conditions, and in the presence of a suitable catalyst.

While the catalyst and process of the present invention can be used to treat a hydrocarbon stream containing a substantial amount of nitrogen compounds, they can be used also to treat a hydrocarbon stream that contains less than 0.2 wt% nitrogen.

Broadly, there is provided a catalyst which comprises a hydrogenation component comprising chromium, molybdenum, and at least one Group VIII metal, a crystalline molecular sieve zeolite having a pore diameter of at least 5 Å (0.5 nm) and containing exchangeable cations, and a porous refractory inorganic oxide, the metals of said hydrogenation component being present in the elemental form, as oxides, as sulfides, or mixtures thereof. In one embodiment, there is provided a catalyst which comprises a hydrogenation component comprising chromium, molybdenum, and at least one Group VIII metal deposed upon a porous support comprising a crystalline molecular sieve zeolite having a pore diameter of at least 5 Å (0.5 nm) and containing exchangeable cations suspended in and distributed throughout a matrix of a refractory inorganic oxide, the metals of said hydrogenation component being present in the elemental form, as oxides, as sulfides, or mixtures thereof. In another embodiment, there is provided a catalyst which comprises a hydrogenation component comprising chromium, molybdenum, and at least one Group VIII metal deposed upon a refractory inorganic oxide that is intimately admixed in a physical particulate mixture with a crystalline molecular sieve zeolite having a pore diameter of at least 5 Å (0.5 nm) and containing exchangeable cations, the metals of said hydrogenation component being present in the elemental form, as oxides, as sulfides, or mixtures thereof.

More particularly, there is provided a catalyst which comprises a hydrogenation component comprising chromium, molybdenum, and at least one Group VIII metal deposed upon a porous support comprising a crystalline molecular sieve zeolite selected from the group consisting of a faujasite-type crystalline aluminosilicate, a mordenite-type crystalline aluminosilicate, a ZSM-type crystalline aluminosilicate, and an AMS-type crystalline metallosilicate suspended in and distributed throughout a matrix of a refractory inorganic oxide support material, the metals of said hydrogenation component being present in the elemental form, as oxides, as sulfides, or mixtures thereof. In addition, there is provided a catalyst which comprises a hydrogenation component comprising chromium, molybdenum, and at least one Group VIII metal deposed upon a porous support comprising a crystalline molecular sieve zeolite selected from the group consisting of ultrastable, large-pore crystalline aluminosilicate material, a rare earth metal-exchanged Y-type aluminosilicate, a ZSM-5 crystalline aluminosilicate, and an AMS-1B crystalline borosilicate suspended in and distributed throughout a matrix of a refractory inorganic oxide support material, the metals of said hydrogenation component being present in the elemental form, as oxides, as sulfides, or mixtures thereof.

There is also provided a process for the hydrodenitrogenation and hydrocracking of a hydrocarbon stream containing a substantial amount of nitrogen compounds, which process comprises contacting said stream in a reaction zone under suitable conditions and in the presence of hydrogen with a catalyst comprising a hydrogenation component comprising chromium, molybdenum, and at least one Group VIII metal, a crystalline molecular sieve zeolite having a pore diameter of at least 5 Å (0.5 nm) and containing exchangeable cations, and a porous refractory inorganic oxide, the metals of said hydrogenation component being present in the elemental form, as oxides, as sulfides, or mixtures thereof. In one embodiment, there is provided a process for the hydrodenitrogenation and hydrocracking of a hydrocarbon stream containing a substantial amount of nitrogen compounds, which process comprises contacting said stream in a reaction zone under suitable conditions and in the presence of hydrogen with a catalyst comprising a hydrogenation component comprising chromium, molybdenum, and at least one Group VIII metal deposed upon a porous support comprising a crystalline molecular sieve zeolite having a pore diameter of at least 5 Å (0.5 nm) and containing exchangeable cations suspended in and distributed throughout a matrix of a refractory inorganic oxide support material, the metals of said hydrogenation component being present in the elemental form, as oxides, as sulfides, or mixtures thereof. In another embodiment, there is provided a process for the hydrodenitrogenation and hydrocracking of a hydrocarbon stream containing a substantial amount of nitrogen compounds, which process comprises contacting said stream in a reaction zone under suitable conditions and in the presence of hydrogen with a catalyst comprising a hydrogenation component comprising chromium, molybdenum, and at least one Group VIII metal deposed upon a refractory inorganic oxide that is intimately admixed in a physical particulate mixture with a crystalline molecular sieve zeolite having a pore diameter of at least 5 Å (0.5 nm) and containing exchangeable cations, the metals of said hydrogenation component being present in the elemental form, as oxides, as sulfides, or mixtures thereof.

More particularly, there is provided a process for the hydrodenitrogenation and hydrocracking of a hydrocarbon stream containing a substantial amount of nitrogen compounds, which process comprises contacting said stream in a reaction zone under suitable conditions and in the presence of hydrogen with a catalyst comprising a hydrogenation component comprising chromium, molybdenum, and at least one Group VIII metal deposed upon a porous support comprising a crystalline molecular sieve zeolite selected from the group consisting of a faujasite-type crystalline aluminosilicate, a mordenite-type crystalline aluminosilicate, a ZSM-type crystalline aluminosilicate, and an AMS-type crystalline metallosilicate suspended in and distributed throughout a matrix of a refractory inorganic oxide support material, the metals of said hydrogenation component being present in the elemental form, as oxides, as sulfides, or mixtures thereof. In addition, there is provided a process for the hydrodenitrogenation and hydrocracking of a hydrocarbon stream containing a substantial amount of nitrogen compounds, which process comprises contacting said stream in a reaction zone under suitable conditions and in the presence of hydrogen with a catalyst comprising a hydrogenation component comprising chromium, molybdenum, and at least one Group VIII metal deposed upon a porous support comprising a crystalline molecular sieve zeolite selected from the group consisting of ultrastable, large-pore crystalline aluminosilicate material, a crystalline Y-type aluminosilicate, a rare earth metal-exchanged crystalline Y-type aluminosilicate, a ZSM-5 crystalline aluminosilicate, and an AMS-1B crystalline borosilicate suspended in and distributed throughout a matrix of a refractory inorganic oxide support material, the metals of said hydrogenation component being present in the elemental form, as oxides, as sulfides, or mixtures thereof.

In addition, there is provided a process for the hydrodenitrogenation and hydrocracking of a hydrocarbon stream comprising whole shale oil or any fraction thereof to produce jet fuel components, which process comprises contacting said stream in a reaction zone under suitable conditions and in the presence of hydrogen with a catalyst comprising a hydrogenation component comprising chromium, molybdenum, and at least one Group VIII metal, a crystalline molecular sieve zeolite having a pore diameter of at least 5 Å (0.5 nm) and containing exchangeable cations, and a porous refractory inorganic oxide, the metals of said hydrogenation component being present in the elemental form, as oxides, as sulfides, or mixtures thereof. In one embodiment, there is provided a process for the hydrodenitrogenation and hydrocracking of a hydrocarbon stream comprising whole shale oil or any fraction thereof to produce jet fuel components, which process comprises contacting said stream in a reaction zone under suitable conditions and in the presence of hydrogen with a catalyst comprising a hydrogenation component comprising chromium, molybdenum, and at least one Group VIII metal deposed upon a porous support comprising a crystalline molecular sieve zeolite having a pore diameter of at least 5 Å (0.5 nm) and containing exchangeable cations suspended in and distributed throughout a matrix of a refractory inorganic oxide, the metals of said hydrogenation component being present in the elemental form, as oxides, as sulfides, or mixtures thereof. In another embodiment, there is provided a process for the hydrodenitrogenation and hydrocracking of a hydrocarbon stream comprising whole shale oil or any fraction thereof to produce jet fuel components, which process comprises contacting said stream in a reaction zone under suitable conditions and in the presence of hydrogen with a catalyst comprising a hydrogenation component comprising chromium, molybdenum, and at least one Group VIII metal deposed upon a refractory inorganic oxide that is intimately admixed in a physical particulate mixture with a crystalline molecular sieve zeolite having a pore diameter of at least 5 Å (0.5 nm) and containing exchangeable cations, the metals of said hydrogenation component being present in the elemental form, as oxides, as sulfides, or mixtures thereof.

More particularly, there is provided a process for the hydrodenitrogenation and hydrocracking of a hydrocarbon stream comprising whole shale oil or any fraction thereof to produce jet fuel components, which process comprises contacting said stream in a reaction zone under suitable conditions and in the presence of hydrogen with a catalyst comprising a hydrogenation component comprising chromium, molybdenum, and at least one Group VIII metal deposed upon a support comprising a crystalline molecular sieve zeolite selected from the group consisting of a faujasite-type crystalline aluminosilicate, a mordenite-type crystalline aluminosilicate, a ZSM-type crystalline aluminosilicate, and an AMS-type crystalline metallosilicate suspended in and distributed throughout a matrix of a refractory inorganic oxide support material, the metals of said hydrogenation component being present in the elemental form, as oxides, as sulfides, or mixtures thereof. In addition, there is provided a process for the hydrodenitrogenation and hydrocracking of a hydrocarbon stream comprising whole shale oil or any fraction thereof to produce jet fuel components, which process comprises contacting said stream in a reaction zone under suitable conditions and in the presence of hydrogen with a catalyst comprising a hydrogenation component comprising chromium, molybdenum, and at least one Group VIII metal deposed upon a porous support comprising a crystalline molecular sieve zeolite selected from the grouup consisting of ultrastable, large-pore crystalline aluminosilicate material, a crystalline Y-type aluminosilicate, a rare earth metal-exchanged crystalline Y-type aluminosilicate, a ZSM-5 crystalline aluminosilicate, and an AMS-1B crystalline borosilicate suspended in and distributed throughout a matrix of a refractory inorganic oxide support material, the metals of said hydrogenation component being present in the elemental form, as oxides, as sulfides, or mixtures thereof.

The catalyst of the present invention contains a hydrogenation component deposed or deposited upon a porous support comprising a molecular sieve zeolite and a refractory inorganic oxide or, alternatively, upon the refractory inorganic oxide. This hydrogenation component comprises chromium, molybdenum, and at least one Group VIII metal from the Periodic Table of Elements. The Periodic Table of Elements referred to herein is the table found on page 628 of WEBSTER'S SEVENTH NEW COLLEGIATE DICTIONARY, G. & C. Merriam Company, Springfield, Mass., U.S.A. (1963). The various metals of the hydrogenation component can be present in the elemental form, as oxides, as sulfides, or as mixtures thereof. The Group VIII metal is advantageously a non-noble metal and is preferably nickel or cobalt.

The catalyst contains the metal of Group VIII in an amount which falls within the range of about 0.5 wt% to about 10 wt%, calculated as the oxide of the metal, the molybdenum is present in an amount that falls within the range of about 5 wt% to about 25 wt%, calculated as $MoO_3$, and the chromium in an amount that falls within the range of about 3 wt% to about 15 wt%, calculated as $Cr_2O_3$, each amount being based upon the weight of the catalyst. Preferably, the catalyst should contain the Group VIII metal, preferably cobalt or nickel, in an amount within the range of about 1 wt% to about 5 wt%, calculated as the oxide of the metal, molybdenum in an amount within the range of about 12 wt% to about 18 wt%, calculated as $MoO_3$, and chromium in an amount within the range of about 7 wt% to about 12 wt%, calculated as $Cr_2O_3$, each amount being based upon the total weight of the catalyst.

An essential component of the support material of the catalyst of the present invention is a crystalline molecular sieve zeolite having a pore diameter of at least 5 Å (0.5 nm) and containing exchangeable cations. Such molecular sieve zeolite can be selected from the group consisting of a faujasite-type crystalline aluminosilicate, a mordenite-type crystalline aluminosilicate, a ZSM-type crystalline aluminosilicate, and an AMS-type crystalline metallosilicate. Examples of a faujasite-type crystalline aluminosilicate are high- and low-alkali metal Y-type crystalline aluminosilicates, metal-exchanged X-type and Y-type crystalline aluminosilicates, and ultrastable, large-pore crystalline aluminosilicate material. Zeolon is an example of a mordenite-type crystalline aluminosilicate. An example of a ZSM-type crystalline aluminosilicate is ZSM-5 crystalline aluminosilicate. AMS-1B crystalline borosilicate is an example of an AMS-type crystalline metallosilicate. One or more of these molecular sieves are suspended in and distributed throughout a matrix of a refractory inorganic oxide material. The molecular sieve component is present in an amount within the range of about 5 wt% to about 90 wt%, preferably within the range of about 20 wt% to about 50 wt%, based upon the weight of the support of the catalyst, which support is made up of the molecular sieve material and the refractory inorganic oxide. Such concentrations of zeolite will provide suitable catalysts for upgrading feeds containing substantial amounts of nitrogen.

Ultrastable, large-pore crystalline aluminosilicate material is represented by Z-14US zeolites which are described in U.S. Pat. Nos. 3,293,192 and 3,449,070. Each of these patents is incorporated by reference herein and made a part hereof. By large-pore material is meant a material that has pores which are sufficiently large to permit the passage thereinto of benzene molecules and larger molecules and the passage therefrom of reaction products. For use in petroleum hydrocarbon conversion processes, it is often preferred to employ a large-pore molecular sieve material having a pore size of at least 5 Å (0.5 nm) to 10 Å (1 nm).

The ultrastable, large-pore crystalline aluminosilicate material is stable to exposure to elevated temperatures. This stability to elevated temperatures is discussed in the aforementioned U.S. Pat. Nos. 3,293,192 and 3,449,070. It may be demonstrated by a surface area measurement after calcination at 1,725° F. In addition, the ultrastable, large-pore crystalline aluminosilicate material exhibits extremely good stability toward wetting, which is defined as the ability of a particular aluminosilicate material to retain surface area or nitrogen-adsorption capacity after contact with water or water vapor. A sodium-form of the ultrastable, large-pore crystalline aluminosilicate material (about 2.15 wt% sodium) was shown to have a loss in nitrogen-adsorption capacity that is less than 2% per wetting, when tested for stability to wetting by subjecting the material to a number of consecutive cycles, each cycle consisting of a wetting and a drying.

The ultrastable, large-pore crystalline aluminosilicate material that is preferred for the catalytic composition of this invention exhibits a cubic unit cell dimension and hydroxyl infrared bands that distinguish it from other aluminosilicate materials. The cubic unit cell dimension of the preferred ultrastable, large-pore crystalline aluminosilicate is within the range of about 24.20 Angstrom units (Å) to about 24.55 Å. The hydroxyl infrared bands obtained with the preferred ultrastable, large-pore crystalline aluminosilicate material are a band near 3,745 cm$^{-1}$ (3,745±5 cm$^{-1}$), a band near 3,695 cm$^{-1}$ (3,690±10 cm$^{-1}$), and a band near 3,625 cm$^{-1}$ (3,610±15 cm$^{-1}$). The band near 3,745 cm$^{-1}$ may be found on many of the hydrogen-form and decationized aluminosilicate materials, but the band near 3,695 cm$^{-1}$ and the band near 3,625 cm$^{-1}$ are characteristic of the preferred ultrastable, large-pore crystalline aluminosilicate material that is used in the catalyst of the present invention.

The ultrastable, large-pore crystalline aluminosilicate material is characterized also by an alkaline metal content of less than 1%.

Other examples of crystalline molecular sieve zeolites that are suitable for the catalyst of the present invention are a high-sodium Y-type crystalline aluminosilicate such as the sodium-Y molecular sieve designated Catalyst Base 30-200 and obtained from the Linde Division of Union Carbide Corporation and a low-sodium Y-type molecular sieve designated as low-soda Diutur-nal-Y-33-200 and obtained from the Linde Division of Union Carbide Corporation.

Another example of a crystalline molecular sieve zeolite that can be employed in the catalytic composition of the present invention is a metal-exchanged Y-type molecular sieve. Y-type zeolitic molecular sieves are discussed in U.S. Pat. No. 3,130,007. The metal-exchanged Y-type molecular sieve can be prepared by replacing the original cation associated with the molecular sieve by a wide variety of other cations according to techniques that are known in the art. Ion exchange techniques have been disclosed in many patents, several of which are U.S. Pat. Nos. 3,140,249, 3,140,251, and 3,140,253. Specifically, a mixture of rare earth metals can be exchanged into a Y-type zeolitic molecular sieve and such rare earth metal-exchanged Y-type molecular sieve can be employed suitably in the catalytic composition of the present invention. Specific examples of suitable rare earth metals are cerium, lanthanum, and praseodymium.

Another zeolitic molecular sieve material that is used in the catalytic composition of the present invention is ZSM-5 crystalline zeolitic molecular sieves. Descriptions of the ZSM-5 composition and its method of preparation are presented by Argauer, et al., in U.S. Pat. No. 3,702,886. This patent is incorporated by reference herein and made a part hereof.

An additional molecular sieve that can be used in the catalytic composition of the present invention is AMS-1B crystalline borosilicate, which is described in U.S. Pat. No. 4,269,813, which patent is incorporated by reference herein and made a part hereof.

A suitable AMS-1B crystalline borosilicate is a molecular sieve material having the following composition in terms of mole ratios of oxides:

$$0.9\pm 0.2 M_{2/n}O:B_2O_3:YSiO_2:ZH_2O,$$

wherein M is at least one cation having a valence of n, Y is within the range of 4 to about 600, and Z is within the range of 0 to about 160, and providing an X-ray diffraction pattern comprising the following X-ray diffraction lines and assigned strengths:

| d (Å) | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

Mordenite-type crystalline aluminosilicates can be employed in the catalyst of the present invention. Mordenite-type crystalline aluminosilicate zeolites have been discussed in patent art, e.g., by Kimberlin in U.S. Pat. No. 3,247,098, by Benesi, et al., in U.S. Pat. No. 3,281,483, and by Adams, et al., in U.S. Pat. No. 3,299,153. Those portions of each of these patents which portions are directed to mordenite-type aluminosilicates are incorporated by reference herein and made a part hereof. Synthetic mordenite-structure crystalline aluminosilicate zeolites, designated as Zeolon, are available from the Norton Company of Worcester, Mass., U.S.A.

The other essential component of the support material of the catalyst of the present invention is a high-surface area inorganic oxide support, such as alumina, silica, or a mixture of silica and alumina. The mixtures of silica and alumina can include, but not be limited to, those compositions which are recognized by one having ordinary skill in the art as being a component of fluid cracking catalysts. Such silica-alumina material contains alumina, generally, within the range of about 10 wt% to about 45 wt%.

A preferred high-surface area refractory inorganic oxide is catalytically active alumina, such as gamma-alumina or eta-alumina. Such aluminas have a surface area within the range of about 150 m$^2$/gm to about 350 m$^2$/gm, or larger, a pore volume within the range of about 0.3 cc/gm to about 1 cc/gm, and an average pore diameter within the range of about 60 Å (6 nm) to about 200 Å (20 nm).

The catalytic composition of the present invention can be prepared by first making a support material comprising the particular crystalline zeolitic molecular sieve and matrix of a refractory inorganic oxide, such as alumina. This is done preferably by blending finely-divided crystalline molecular sieve in a sol, hydrosol, or hydrogel of the inorganic oxide, adding a gelling medium such as ammonium hydroxide to the blend with constant stirring to produce a gel, drying, pelleting or extruding, and calcining. Drying can be accomplished in static air at a temperature within the range of 80° F. (27° C.) to about 350° F. (177° C.) for a period of time within the range of about 1 hour to about 50 hours. Calcination is performed conveniently by heating in air at a temperature in excess of 800° F. (427° C.) to about 1,200° F. (649° C.) for a period within the range of about 0.5 hour to about 16 hours.

An alternative method for preparing the catalyst support comprises physically mixing finely-divided particles of the appropriate molecular sieve zeolite with finely-divided particles of the refractory inorganic oxide, thoroughly blending the mechanical mixture, and subsequently pelleting or extruding the blended mixture into appropriately-sized particles. If the hydrogenation component is to be solely upon the refractory inorganic oxide portion of the support material, the finely-divided particles of the appropriate molecular sieve zeolite can be physically admixed with finely-divided particles of the impregnated refractory inorganic oxide, and the mechanical mixture can be blended and subsequently pelleted or extruded into appropriately-sized particles.

The catalyst of the present invention can be used conveniently in a fixed bed in the form of pellets, spheres, or extrudates. It is contemplated further that the catalyst can be present as other shapes, such as a clover leaf, cross shape, or C shape, as disclosed by Hoekstra, et al., in U.S. Pat. Nos. 3,674,680 and 3,764,565.

The hydrogenation component can then be incorporated onto the resultant support material by impregnation of the support with one or more solutions of heat-decomposable metal compounds, drying, and calcining as described hereinabove. If impregnation is to be performed with more than one solution, it is preferred that the solution containing the compound of chromium be applied first. However, it is to be understood that the metals can be applied in any order. In the case when the hydrogenation component is to be deposed upon the refractory inorganic oxide, one or more solutions of heat-decomposable metal compounds are employed to impregnate the particular refractory inorganic oxide with the various metals. Such impregnation can be followed by drying and calcining as described hereinabove. The impregnated refractory inorganic oxide material in a finely-divided form can then be physically admixed with appropriately-sized particles of the selected molecular sieve zeolite.

The catalyst of the present invention is characterized by the following apparent pore size distribution, as would be obtained by a Digisorb 2500 instrument employing nitrogen desorption techniques: 30% to 55% of the total pore volume in pores having diameters less than 50 Å (5 nm); 30% to 60% of the total pore volume in pores having diameters within the range of 50 Å (5 nm) to 100 Å (10 nm); and less than 25% of the total pore volume in pores having diameters greater than 100 Å (10 nm). The term "apparent pore size distribution" is used since the large range of catalyst-support-composition values makes it very difficult to fix ranges of values for the pore size distribution.

An advantage of the catalyst of the present invention is its high-temperature stability, i.e., its ability to perform satisfactorily at high temperatures over an extended period of time. The high temperature is an ideal condition since it enables ammonia to be desorbed and permits hydrocracking to occur in the presence of ammonia. This ideal condition of high temperature does not appear to effect deleteriously the performance of the catalyst. The chromium in the hydrogenation component of the catalyst provides the high temperature stability. The combination of a Group VIII metal and molybdenum affords an active component for hydrogenation, denitrogenation and desulfurization. The presence of a molecular sieve zeolite in the catalyst provides an acidic component which promotes denitrogenation and cracking. The presence of the refractory inorganic oxide affords a suitable high-surface area for the active component of the catalyst.

The acidity of the catalyst of the present invention can be enhanced by the addition of a halogen, for example, fluorine or chlorine.

Prior to use in the process of the present invention, the catalyst is subjected to a sulfiding pretreatment. This sulfiding pretreatment is necessary because the metal constituents of the hydrogenation component should be in a partially-reduced state. The sulfiding will provide such partially-reduced metals, but will not reduce the metals completely to the elemental form, which form is inactive.

A convenient sulfiding pretreatment comprises heating the catalyst to a temperature within the range of about 250° F. (121° C.) to about 350° F. (177° C.), passing a gas mixture of hydrogen sulfide in hydrogen over and through the catalyst at a variable pressure for a period of about 0.5 hour to about 2 hours, raising the temperature to a value within the range of about 350° F. (177° C.) to about 450° F. (232° C.), continuing to pass the gas mixture at this latter temperature over and through the catalyst for an additional period of about 0.5 hour to about 2 hours, raising the temperature to a value of about 650° F. (343° C.) to about 750° F. (399° C.), and continuing to pass the hydrogen sulfide-hydrogen gas mixture through the catalyst for an additional period of about 0.5 hour to about 2 hours. Suitably, sufficient gas should be employed to provide about 110% of the stoichiometric amount of hydrogen sulfide needed to sulfide the metals of the hydrogenation component. The concentration of hydrogen sulfide in the gas is not critical. Subsequently, hydrogen-containing gas is introduced into the reactor and permitted to flow through the catalyst at operating pressure. A suitable flow rate for the hydrogen-containing gas is the hydrogen addition rate provided hereinbelow. The hydrocarbon feed to be treated by the process can then be introduced into the reactor.

While the above sulfiding pretreatment is a convenient way of pretreating the catalyst, other suitable methods known to those skilled in the art can be employed. For example, carbon disulfide can be added to the zone containing the catalyst or a light hydrocarbon oil containing sulfur can be passed over the catalyst for a time that is sufficient to provide the appropriate metal sulfides on the catalyst.

The operating conditions for the process of the present invention comprise a temperature within the range of about 700° F. (371° C.) to about 800° F. (427° C.), a hydrogen partial pressure within the range of about 1,000 psi (6,890 kPa) to about 2,500 psi (17,225 kPa), a liquid hourly space velocity (LHSV) within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 standard cubic feet of hydrogen per barrel of hydrocarbon (SCFB) (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon. Preferably, the conditions comprise a temperature within the range of about 740° F. (393° C.) to about 790° F. (416° C.), a hydrogen partial pressure within the range of about 1,600 psi (11,024 kPa) to about 2,000 psi (13,780 kPa), an LHSV within the range of about 0.3 volume of hydrocarbon per hour per volume of catalyst to about 2 volumes of hydrocarbon per hour per volume of catalyst, a hydrogen addition rate or hydrogen recycle rate within the range of about 6,000 SCFB (1,079 m$^3$/m$^3$) to about 14,000 SCFB (2,517 m$^3$/m$^3$), and a hydrogen-to-hydrocarbon molar ratio within the range of about 10 moles of hydrogen per mole of hydrocarbon to about 30 moles of hydrogen per mole of hydrocarbon.

Since some of the feedstocks that can be treated by the process of the present invention will contain arsenic and other metals that are detrimental to the catalyst of the process of the present invention, a guard chamber can appropriately precede the reaction zone of the process of the present invention. This guard chamber can contain a porous refractory inorganic oxide or absorbent, such as a cheap or used catalyst. Such material should remove from the feedstock and retain efficiently such deleterious metals.

The following specific examples are being presented in order to facilitate the understanding of the present invention and are presented for the purposes of illustration only and are not intended to limit the scope of the present invention.

Seven catalysts were prepared and tested for their ability to hydrodenitrogenate and hydrocrack a whole shale oil that had been obtained from in situ retorting of oil shale by the Occidental Petroleum Corporation. Each of the seven catalysts and the tests of those particular catalysts are presented in one of the following Examples I through VII.

EXAMPLE I

A catalyst, identified hereinafter as Catalyst A, was prepared.

A 147-gram portion of Aero 100A alumina, in the form of 1/16-inch extrudates, obtained from the American Cyanamid Company was calcined at a temperature of 1,000° F. (538° C.) for at least one hour. The calcined extrudates were then impregnated with a solution that had been prepared by dissolving 33.2 grams of $(NH_4)_2Cr_2O_7$ in 145 milliliters of distilled water. After standing for a short time, the impregnated material was dried in an oven under a vacuum at a temperature of about 212° F. (100° C.) overnight (approximately 16 hours). The resulting dried material was then calcined in static air at a temperature of 1,000° F. (538° C.) for 3 hours. The resulting material was then impregnated with a solution that had been prepared by dissolving 11.65 grams of $Co(NO_3)_2.6H_2O$ and 36.8 grams of $(NH_4)_6Mo_7O_{24}.4H_2O$ in sufficient distilled water to obtain 120 milliliters of solution. The solid material and solution were permitted to stand for approximately 1 hour and then the solid material was placed in an oven under a vacuum and heated at a temperature of 212° F. (100° C.) for 2 hours and calcined subsequently overnight (approximately 16 hours) at a temperature of 1,000° F. (538° C.).

The calcined material was then ground and sized to a 14/20-mesh material, i.e., material that would pass through a 14-mesh screen (Tyler) but be retained upon a 20-mesh screen (Tyler). This catalyst, identified hereinafter as Catalyst A, was prepared to contain 1.5 wt% CoO, 10 wt% $Cr_2O_3$, and 15 wt% $MoO_3$ on an alumina support.

Catalyst A was tested in an automated hydrotreating pilot plant. This bench-scale test unit had automatic controls for pressure, flow of reactants, and temperature. The reactor was made from ⅜-inch-inside diameter, stainless steel, heavy-walled tubing. A ⅛-inch-outside diameter thermowell extended up through the center of the reactor. The reactor was heated by an electrically-heated steel block. The hydrocarbon feedstock was fed to the unit by means of a Ruska pump, a positive-displacement pump.

Catalyst A was loaded into a vertical reactor from the bottom up. The 14/20-mesh material was supported on 8/10-mesh alundum particles, i.e., particles that would pass through an 8-mesh screen (Tyler), but be retained upon a 10-mesh screen (Tyler). Approximately 20 cubic centimeters of catalyst were employed as the catalyst bed in this test, as well as in each of the tests discussed hereinafter, the amount being that required to provide a LHSV of 0.5 cubic centimeter of hydrocarbon per hour per cubic centimeter of catalyst. This amount of catalyst provided a length of catalyst bed of about 10 inches to about 12 inches. A layer of 8/10-mesh alundum particles was placed over the catalyst to fill the top part of the reactor. The catalyst was located in the annular space between the thermowell and the internal wall of the ⅜-inch-inside diameter reactor.

After the catalyst was loaded into the reactor, it was subjected to the following sulfiding pretreatment. The temperature of the catalyst bed was raised to about 300° F. (149° C.) and a gas mixture of 8% hydrogen sulfide in hydrogen was passed through the catalyst bed at a variable pressure. At the end of approximately 1 hour, the temperature was raised to about 400° F. (204° C.) and the hydrogen sulfide-containing gas was passed over or through the catalyst for an additional hour. Then the temperature was raised to 700° F. (371° C.) and the hydrogen sulfide-hydrogen gas mixture was passed through the catalyst for an additional hour, at which time its flow was stopped. At least one standard cubic foot of hydrogen-hydrogen sulfide gas, and preferably at least one standard cubic foot per hour, had been passed through the catalyst bed. Hydrogen gas was then introduced into the reactor and allowed to flow through the catalyst bed at a pressure of 1,800 psi (12,402 kPa) and a flow rate of about 15 liters per hour. The Ruska pump was started, hydrocarbon bed was permitted to flow through the reactor, and the temperature of the catalyst bed was raised to the appropriate reaction temperature. Effluent from the reaction zone was passed into a gas-liquid high-pressure separator, wherein the gas was separated from the liquid. The gas was passed through a pressure control valve and a wet test meter to an appropriate vent. The liquid product was passed through a pressure control valve to a liquid product receiver.

In this and the following tests, the feed rate was set at about 10.3 cubic centimeters per hour, a liquid hourly space velocity (LHSV) of 0.5 volume of hydrocarbon per hour per volume of catalyst, and the temperature of the catalyst bed was approximately 780° F. (416° C.). The hydrogen addition rate was about 10,000 SCFB (1,798 m³/m³).

The feedstock that was employed in this test, as well as in the tests in the other examples, was a whole shale oil that had been obtained by in situ retorting by the Occidental Petroleum Corporation. The properties of this feed, hereinafter identified as Feed 1, are presented hereinafter in Table I.

TABLE I

| Properties of Feed 1 | |
|---|---|
| Gravity, °API | 23.8 |
| Carbon, wt % | 84.87 |
| Hydrogen, wt % | 11.84 |
| Nitrogen, wt % | 1.32 |
| Sulfur, wt % | 0.64 |
| Oxygen, wt % | 1.33 |
| Pour Point, °F. | 60 |
| °C. | 15.6 |
| Viscosity, cst (40° C.) | 32.9 |
| cst (100° C.) | 5.10 |
| Ramsbottom Carbon, wt % | 1.22 |
| ASTM Distillation, °F. (°C.) | |
| IBP | 290 (143) |
| 5% | 404 (206) |
| 30% | 566 (297) |
| 60% | 744 (395) |
| % at 1,000° F. (538° C.) | 87.2 |
| IBP - 360° F. (182° C.), wt % | 1.5 |
| 360° F. (182° C.)–650° F. (343° C.), wt % | 45.8 |
| 650° F.+ (343° C.+) wt % | 52.7 |
| JP-4 Fraction, wt % | 15.5 |
| Contaminants, ppm | |
| Iron | 41 |
| Nickel | 10 |
| Vanadium | about 1 |
| Arsenic | 26 |
| Sodium | about 12 |
| Molybdenum | 3 |

For convenience, the jet fuel component is identified hereinabove in Table I and hereinafter in subsequent tables as JP-4 jet fuel boiling range material. It is intended that such designation not limit the scope of the process of the present invention and that the term "jet fuel" as used herein and in the claims encompass and include all types of jet fuel boiling range material.

The results obtained from the conversion of Feed No. 1 with Catalyst A in Test No. 1 are presented hereinafter in Table II.

TABLE II

| DATA FOR TEST NO. 1, CATALYST A | | | | | | | |
|---|---|---|---|---|---|---|---|
| Period No. | 1 | 2 | 3 | 4 | 5 | 6 | 7 |
| Hours on Stream | 19 | 43 | 67 | 91 | 115 | 139 | 163 |
| Temperature, °F. | 779 | — | — | 780 | 780 | 780 | 780 |
| °C. | 415 | — | — | 416 | 416 | 416 | 416 |
| Pressure, psig | 1,800 | 1,800 | 1,800 | 1,800 | 1,800 | 1,800 | 1,800 |
| kPa | 12,514 | 12,514 | 12,514 | 12,514 | 12,514 | 12,514 | 12,514 |
| LHSV, hr$^{-1}$ | 0.5 | 0.5 | 0.5 | 0.5 | 0.5 | 0.5 | 0.5 |
| Gravity, °API | 39.9 | 39.0 | 39.1 | 39.1 | 39.0 | 39.2 | 39.2 |
| Carbon, wt % | — | — | — | — | — | — | 86.32 |
| Hydrogen, wt % | — | — | — | — | — | — | 13.65 |
| Nitrogen, ppm | 78 | 82 | 83 | 88 | 82 | 116 | 110 |
| Sulfur, ppm | 358 | 120 | 293 | 122 | 183 | — | 117 |
| Pour Point, °F. | — | — | — | — | — | — | 80 |
| °C. | — | — | — | — | — | — | 27 |
| Viscosity, cst (40° C.) | — | — | — | — | — | — | 3.24 |
| IBP, °F. | — | — | — | — | — | — | 5 |
| °C. | — | — | — | — | — | — | −15 |
| IBP - 360° F. (182° C.), wt % | — | — | — | — | — | — | 15.1 |
| 360° F. (182° C.)–650° F. (343° C.), wt % | — | — | — | — | — | — | 60.9 |
| 650° F.+ (343° C.+), wt % | — | — | — | — | — | 24.0 | |
| FBP, °F. | — | — | — | — | — | — | 915 |
| °C. | — | — | — | — | — | — | 491 |
| JP-4 Fraction, wt % | — | — | — | — | — | — | 38.1 |
| Gas rate, SCFB × 10³ | — | — | — | — | — | — | 10.0 |
| Hydrogen consumption, SCFB | — | — | — | — | — | — | 1,400 |

TABLE II-continued

| | DATA FOR TEST NO. 1, CATALYST A | | | | | | |
|---|---|---|---|---|---|---|---|
| Period No. | 1 | 2 | 3 | 4 | 5 | 6 | 7 |
| Hours on Stream | 19 | 43 | 67 | 91 | 115 | 139 | 163 |
| Wt % recovered | — | — | — | — | — | — | 103.2 |
| Wt % $C_1$-$C_4$ on Feed | — | — | — | — | — | — | 2.8 |

EXAMPLE II

A second catalyst, identified hereinafter as Catalyst B, was prepared to have a support composed of 30 wt% ultrastable, large-pore aluminosilicate material and 70 wt% alumina.

A 681-gram portion of finely-divided ultrastable, large-pore crystalline aluminosilicate material, obtained from W. R. Grace and Company, was introduced into 15,890 grams of a PHF-alumina hydrosol (approximately 10% solids) and the resulting mixture was stirred for approximately 2 hours, at which time a solution of 400 milliliters of concentrated ammonium hydroxide mixed with 400 milliliters of distilled water was added to gel the hydrosol. The resulting gel was then dried overnight (approximately 16 hours) in static air at a temperature of 250° F. (121° C.). The dried material was then ground to pass through a 100-mesh screen (Tyler). Sufficient distilled water was added to the 100-mesh material to facilitate extrusion and the material was then extruded to 5/64-inch extrudates and dried overnight (approximately 16 hours) at a temperature of 250° F. (121° C.). The dried extrudates were then calcined in static air for 3 hours at a temperature of 1,000° F. (538° C.).

A 294-gram portion of the calcined material containing ultrastable, large-pore crystalline aluminosilicate material was impregnated with a solution that had been prepared by dissolving 66.4 grams of $(NH_4)_2Cr_2O_7$ in 290 milliliters of distilled water. The extrudate and solution were mixed thoroughly and the mixture was permitted to stand overnight (approximately 16 hours). Then it was calcined at a temperature of 1,000° F. (538° C.) for at least one hour. The calcined material was then impregnated with a solution that had been prepared by dissolving 73.6 grams of $(NH_4)_6Mo_7O_{24}.4H_2O$ in 250 milliliters of distilled water. The mixture of solution and solid was permitted to stand over the weekend (approximately 64 hours). The resulting material was then calcined at a temperature of 1,000° F. (538° C.) for 7 hours.

A 195-gram portion of the above material was impregnated with a solution that had been prepared by dissolving 11.65 grams of $Co(NO_3)_26H_2O$ in 125 milliliters of distilled water. The solution and solid material were mixed and allowed to stand overnight (approximately 16 hours). The resulting material was then calcined at a temperature of 1,000° F. (538° C.) in static air for at least one hour. The calcined material was then ground to pass through a 14-mesh screen (Tyler), but be retained upon a 20-mesh screen (Tyler), i.e., to a 14/20-mesh material.

This catalyst, Catalyst B, was prepared to contain 1.5 wt% CoO, 10 wt% $Cr_2O_3$, and 15 wt% $MoO_3$ on a support composed of 30 wt% ultrastable, large-pore crystalline aluminosilicate material and alumina.

A 20-cubic centimeter portion of Catalyst B was loaded into a reactor as described hereinabove in Example I and was tested for its ability to convert Feed 1. The results of this test, Test No. 2, are presented hereinbelow in Table III.

TABLE III

| | DATA FOR TEST NO. 2, CATALYST B | | | | | | | | | | | |
|---|---|---|---|---|---|---|---|---|---|---|---|---|
| Hours on Stream | 22 | 46 | 70 | 94 | 118 | 142 | 166 | 190 | 214 | 238 | 262 | 286 |
| Temp., °F. | 782 | — | — | 780 | 780 | 780 | 781 | 781 | — | — | 780 | 781 |
| °C. | 417 | — | — | 416 | 416 | 416 | 417 | 417 | — | — | 416 | 417 |
| Pressure, psig | 1,800 | 1,800 | 1,800 | 1,800 | 1,800 | 1,800 | 1,800 | 1,800 | 1,800 | 1,800 | 1,800 | 1,800 |
| kPa | 12,514 | 12,514 | 12,514 | 12,514 | 12,514 | 12,514 | 12,514 | 12,514 | 12,514 | 12,514 | 12,514 | 12,514 |
| LHSV, $hr^{-1}$ | 0.5 | 0.5 | 0.5 | 0.5 | 0.5 | 0.5 | 0.5 | 0.5 | 0.5 | 0.5 | 0.5 | 0.5 |
| Gravity, °API | 55.1 | 50.5 | 47.2 | 45.6 | 44.6 | 43.9 | 44.1 | 42.9 | 43.4 | 43.3 | 42.5 | 43.3 |
| Carbon, wt % | — | — | — | — | 85.93 | — | — | — | — | — | — | 86.12 |
| Hydrogen, wt % | — | — | — | — | 14.00 | — | — | — | — | — | — | 13.87 |
| Nitrogen, ppm | 51 | 13 | 12 | 7 | 15 | 2 | 2 | 5 | 3 | 3 | 2 | 14 |
| Sulfur, ppm | 117 | 220 | 55 | 169 | 710 | 137 | 111 | 85 | 42 | 18 | 17 | 49 |
| Pour Point, °F. | — | — | — | — | 30 | — | — | — | — | — | — | 45 |
| °C. | — | — | — | — | −1 | — | — | — | — | — | — | 7 |
| Viscosity, cst (40° C.) | — | — | — | — | 1.70 | — | — | — | — | — | — | 2.06 |
| IBP, °C. | — | — | — | — | −13 | — | — | — | — | — | — | 6 |
| IBP - 182° C., wt % | — | — | — | — | 29.7 | — | — | — | — | — | — | 24.4 |
| 182° C.-343° C., wt % | — | — | — | — | 57.3 | — | — | — | — | — | — | 58.0 |
| 343° C.+, wt % | — | — | — | — | 13.0 | — | — | — | — | — | — | 17.6 |
| FBP, °F. | — | — | — | — | 868 | — | — | — | — | — | — | |
| °C. | — | — | — | — | 465 | — | — | — | — | — | — | 471 |
| JP-4 Fraction, wt % | — | — | — | — | 59.5 | — | — | — | — | — | — | 52.1 |
| Gas rate, SCFB × $10^3$ | — | — | — | — | 12.0 | — | — | — | — | — | — | 15.0 |
| Hydrogen consumption, SCFB | — | — | — | — | 1,660 | — | — | — | — | — | — | 1,575 |
| Wt % recovered | — | — | — | — | 99.5 | — | — | — | — | — | — | 99.6 |
| Wt % $C_1$-$C_4$ on Feed | — | — | — | — | 3.6 | — | — | — | — | — | — | 3.6 |

A comparison of Catalyst B with Catalyst A shows that Catalyst B provided a product containing a much lower amount of nitrogen and significantly more naphtha and having a pour point that was significantly lower than that of the product obtained with Catalyst A. Therefore, Catalyst B was found to be an improved catalyst for the hydrodenitrogenation and hydrocracking of the whole shale oil feed.

EXAMPLE III

A third catalyst, hereinafter identified as Catalyst C, was prepared to contain 1.5 wt% CoO, 10 wt% $Cr_2O_3$, and 15 wt% $MoO_3$ on a support comprising 20 wt% rare earth metal-exchanged Y-type molecular sieves in a matrix of alumina.

A Y-type molecular sieve, designated as "SK-40" and obtained from the Linde Division of Union Carbide Corporation, was exchanged with a chloride solution of rare earth metals. A 3,000-gram portion of the SK-40 material was slurried in 8 liters of distilled water. The rare earth chloride solution contained cerium, lanthanum, and praseodymium. A 4,000-gram amount of the chloride solution was added to the molecular sieve material and the resulting material was stirred while being heated to reflux for approximately 1 hour. The solids were then allowed to settle overnight (approximately 16 hours) and the supernatant layer, about 5,500 milliliters, was syphoned off of the solid material. Then, 4,000 grams of the rare earth metal solution and 3,000 milliliters of distilled water were added to the solid material and the mixture was stirred while heating to reflux for 1 hour. The solid material was then allowed to settle and 6,200 milliliters of supernatant liquid were syphoned off. Another 4,000 grams of rare earth chloride solution and 3,600 milliliters of distilled water were added to the molecular sieves and the resulting composite was stirred while heating to reflux for 1 hour. The solid material was then permitted to settle and 6,500 milliliters of supernatant liquid were syphoned from the molecular sieves. Subsequently 6,500 milliliters of distilled water were added to the molecular sieve material and resulting composite was stirred with heating for 1 hour at a temperature of 210° F. (99° C.). The slurry was filtered and dried at 250° F. (121° C.) for at least 1 hour and then calcined in air at a temperature of 1,340° F. (727° C.).

The above 3-step exchange with the rare earth metal solution was repeated with the exception that 2,000 grams of the chloride solution were employed and 400 grams of ammonium nitrate were added during the last exchange step. The exchanged material was then washed 4 times with distilled water as above and filtered. The filter cake was dried overnight (approximately 16 hours) at a temperature of 250° F. (121° C.).

The resulting molecular sieve was found to be 100% crystalline and to contain the following elements: 13.3 wt% aluminum, 27.9 wt% silicon, 7.2 wt% cerium, 3.8 wt% lanthanum, 2.7 wt% sodium, and approximately 1 wt% praseodymium.

A 90-gram portion of the rare earth metal-exchanged molecular sieve was ground and screened to pass through a 100-mesh screen (Tyler), made up into a paste by the addition of distilled water, and added to 3,600 grams of a PHF-alumina sol (approximately 10 wt% solids) obtained from the American Cyanamid Company. The resulting mixture was blended in a large blender for 15 minutes. Then 250 cubic centimeters of a solution that had been prepared by mixing equal amounts of distilled water and concentrated ammonium hydroxide were added to the blend to gel the sol. Two of these batches were made and combined and dried at a temperature of 250° F. (121° C.) for approximately 64 hours (over the weekend) in circulating air. The dried material was subsequently ground and sieved to a 100-mesh material, mulled with distilled water, and extruded as 5/64-inch extrudates. The extrudates were dried for 2 hours at a temperature of 250° F. (121° C.) and then calcined in air at a temperature of 1,000° F. (538° C.) for 2 hours.

A 147-gram portion of the calcined rare earth metal-exchanged molecular sieve in a matrix of alumina material was added to a solution that had been prepared by adding 33.2 grams of $(NH_4)_2Cr_2O_7$ in 140 milliliters of distilled water. This mixture was then allowed to stand for 1 hour and then dried under a heat lamp. The dried chromium-containing material was then impregnated with a solution that had been prepared by dissolving 36.8 grams of ammonium molybdate in distilled water and adding to the solution 11.65 grams of $Co(NO_3)_2.6-H_2O$. The mixture was allowed to stand for approximately 1 hour and subsequently dried under a heat lamp. The dried impregnated material was then calcined for 1 hour in air at a temperature of 1,000° F. (538° C.).

A 20-cubic centimeter sample of Catalyst C, as 14/20-mesh particles, was charged to the reactor of a bench-scale pilot plant and was tested for its ability to hydrodenitrogenate and hydrocrack Feed No. 1. The results of this test, Test No. 3, are presented hereinbelow in Table IV.

TABLE IV

| | DATA FOR TEST NO. 3, CATALYST C | | | | | | | |
|---|---|---|---|---|---|---|---|---|
| Hours on Stream | 19 | 43 | 67 | 91 | 115 | 139 | 163 | 187 |
| Temp., °F. | 782 | 778 | — | — | 778 | 778 | 779 | 779 |
| °C. | 417 | 415 | — | — | 415 | 415 | 415 | 415 |
| Pressure, psig | 1,800 | 1,800 | 1,800 | 1,800 | 1,800 | 1,800 | 1,800 | 1,800 |
| kPa | 12,514 | 12,514 | 12,514 | 12,514 | 12,514 | 12,514 | 12,514 | 12,514 |
| LHSV, $hr^{-1}$ | 0.5 | 0.5 | 0.5 | 0.5 | 0.5 | 0.5 | 0.5 | 0.5 |
| Gravity, °API | 52.4 | 50.8 | 45.4 | 41.7 | 39.8 | 39.1 | 38.6 | 39.1 |
| Carbon, wt % | — | — | — | — | — | 86.2 | — | — |
| Hydrogen, wt % | — | — | — | — | — | 13.8 | — | — |
| Nitrogen, ppm | 17 | 2 | 2 | 3 | 9 | 31 | 23 | 27 |
| Sulfur, ppm | 347 | 328 | 57 | 160 | 280 | 151 | 250 | 160 |
| Pour Point, °F. | — | — | — | — | — | 75 | — | — |
| °C. | — | — | — | — | — | 24 | — | — |
| Viscosity, cst (40° C.) | — | — | — | — | — | 3.48 | — | — |
| IBP, °C. | — | — | — | — | — | 40 | — | — |
| IBP - 182° C., wt % | — | — | — | — | — | 13.6 | — | — |
| 182° C.-343° C., | — | — | — | — | — | 57.4 | — | — |

TABLE IV-continued

| Hours on Stream | DATA FOR TEST NO. 3, CATALYST C | | | | | | | |
|---|---|---|---|---|---|---|---|---|
| | 19 | 43 | 67 | 91 | 115 | 139 | 163 | 187 |
| wt % | | | | | | | | |
| 343° C.+, wt % | — | — | — | — | — | 29.0 | — | — |
| FBP, °C. | — | — | — | — | — | 516 | — | — |
| JP-4 Fraction, wt % | — | — | — | — | — | 34.7 | — | — |
| Gas rate, SCFB × $10^3$ | — | — | — | — | — | 11.1 | — | — |
| Hydrogen consumption, SCFB | — | — | — | — | — | 1,470 | — | — |
| Wt % recovered | — | — | — | — | — | 100 | — | — |
| Wt % $C_1$-$C_4$ on Feed | — | — | — | — | — | 2.8 | — | — |

The results presented in Table IV indicate that Catalyst C, when compared to Catalyst A, did a very good job in reducing the amount of nitrogen in the shale oil but only accomplished a small amount of hydrocracking as indicated by the pour point of 75° F. (23.9° C.).

EXAMPLE IV

A fourth catalyst, hereinafter identified as Catalyst D, was prepared. This catalyst contained a support comprising a ZSM-5 aluminosilicate suspended and distributed throughout a matrix of alumina. The ZSM-5 aluminosilicate was prepared first. A 37.2-gram portion of sodium hydroxide was dissolved in 400 milliliters of distilled water. A 207.9-gram portion of tetra-n-propylammonium bromide was added to the solution and dissolved therein. Then 42 grams of sodium aluminate were added to the solution and dissolved therein. Subsequently, 1,077 grams of Ludox AS-30 (30% $SiO_2$) were added to the solution and sufficient distilled water was added to the resulting blend to make a total volume of 1,800 milliliters. The resulting material was then placed in a teflon container and into an autoclave. The material was then maintained at a temperature between 450° F. (232° C.) to 470° F. (243° C.) for 6 days. The crystalline material was removed from the autoclave and washed with hot distilled water by reslurrying three times. The crystalline material was dried in air at 250° F. (121° C.) overnight (approximately 16 hours) and calcined in air for 3 hours at a temperature of 1,000° F. (538° C.). The resulting material was examined by X-ray diffraction and found to be ZSM-5 aluminosilicate material.

A 389-gram portion of the ZSM-5 molecular sieve was exchanged three times by slurrying in 3,000 milliliters of distilled water containing 202 grams of ammonium nitrate, filtering after each exchange, washing three times by reslurrying in 3,500 milliliters of distilled water, and filtering after each wash. The washed and exchanged ZSM-5 material was then dried in air overnight (approximately 16 hours) at a temperature of 250° F. (121° C.) and calcined in air for 3 hours at a temperature of 1,000° F. (538° C.).

This hydrogen form of ZSM-5 material was found to contain 370 parts per million of sodium, 84.9 wt% of silica, and 3.7 wt% alumina. X-ray diffraction analysis showed it to be 84% crystalline and to have the X-ray diffraction pattern of ZSM-5 material.

A 90-gram portion of the hydrogen-form ZSM-5 molecular sieves was ground and screened to pass through 100-mesh screen (Tyler). It was made into a semi-paste material by the addition of distilled water. It was then added in portions to 3,600 grams of PHF-alumina sol (approximately 10 wt% solids) obtained from the American Cyanamid Company. The mixture was blended in a large blender after the addition of each portion of the ZSM-5 material. After all of the molecular sieve had been added to the sol, stirring of the blend continued for a time within the range of about 10 to 15 minutes. Then 250 cubic centimeters of a solution having been prepared with equal amounts of concentrated ammonium hydroxide and distilled water were added to the slurry and the mixture was immediately blended until the sol gelled. This procedure was repeated. Both batches of the final gel were combined and dried in air overnight at a temperature of 250° F. (121° C.) in circulating air.

The dried material was ground and screened to a 100-mesh material (Tyler). The resulting ground material was mulled with distilled water and extruded to form 5/64-inch extrudates, which were then dried in static air overnight (approximately 16 hours) at a temperature of 250° F. (121° C.). The dried extrudates were calcined in air for at least 4 hours at a temperature of 1,000° F. (538° C.). This material was prepared to contain 20 wt% ZSM-5 molecular sieves suspended in and dispersed throughout a matrix of alumina.

A 147-gram portion of the calcined extrudates was impregnated with a solution that had been prepared by dissolving 33.2 grams of $(NH_4)_2Cr_2O_7$ in 145 milliliters of distilled water. The resulting composite was allowed to stand over the weekend (approximately 64 hours). Then it was calcined for 1½ hours at a temperature of 1,000° F. (538° C.) and the material was then impregnated with a solution that had been prepared by dissolving 11.65 grams of $Co(NO_3)_2.6H_2O$ and 36.8 grams of $(NH_4)_6Mo_7O_{24}.4H_2O$ in 125 milliliters of distilled water. This solution was added to the solid material with stirring. After standing for 1 hour, the resulting material was dried under a heat lamp for 2 hours and then in an oven in air for 2 hours at a temperature of 250° F. (121° C.). The dried material was calcined for 2 hours in air at a temperature of 1,000° F. (538° C.). The resultant material, Catalyst D, was prepared to contain 1.5 wt% CoO, 10 wt% $Cr_2O_3$, and 15 wt% $MoO_3$ on a support containing 20 wt% ZSM-5 molecular sieves suspended in and distributed throughout a matrix of alumina, the amount of ZSM-5 molecular sieve being based upon the weight of the support and the amounts of the oxides of the hydrogenation metals being based upon the weight of the total catalyst.

The sample of the catalyst, as 14/20-mesh particles, was charged to the reactor of the small-scale test unit and was tested for its ability to hydrodenitrogenate and hydrocrack Feed No. 1. The results of this test, Test No. 4, are presented hereinbelow in Table V.

TABLE V

| | DATA FOR TEST NO. 4, CATALYST D | | | | | | | | | |
|---|---|---|---|---|---|---|---|---|---|---|
| Hours on Stream | 23 | 47 | 71 | 95 | 119 | 143 | 167 | 191 | 215 | 239 |
| Temp , °F. | 781 | 781 | 781 | 781 | — | — | 781 | 781 | 781 | 781 |
| °C. | 417 | 417 | 417 | 417 | — | — | 417 | 417 | 417 | 417 |
| Pressure, psig | 1,800 | 1,800 | 1,800 | 1,800 | 1,800 | 1,800 | 1,800 | 1,800 | 1,800 | 1,800 |
| kPa | 12,514 | 12,514 | 12,514 | 12,514 | 12,514 | 12,514 | 12,514 | 12,514 | 12,514 | 12,514 |
| LHSV, hr$^{-1}$ | 0.5 | 0.5 | 0.5 | 0.5 | 0.5 | 0.5 | 0.5 | 0.5 | 0.5 | 0.5 |
| Gravity, °API | 40.5 | 39.7 | 40.2 | 39.6 | 39.9 | 40.7 | 40.7 | 40.8 | 39.7 | 39.7 |
| Carbon, wt % | — | — | 86.20 | — | — | — | — | 86.13 | — | — |
| Hydrogen, wt % | — | — | 13.79 | — | — | — | — | 13.75 | — | — |
| Nitrogen, ppm | 23 | 44 | 45 | 42 | 32 | 31 | 29 | 34 | 34 | 32 |
| Sulfur, ppm | 165 | 139 | 61 | 102 | 120 | 374 | 360 | 91 | 120 | 190 |
| Pour Point, °F. | — | — | −15 | — | — | — | — | −10 | — | — |
| °C. | — | — | −26 | — | — | — | — | −23 | — | — |
| Viscosity, cst (40° C.) | — | — | 2.64 | — | — | — | — | 2.72 | — | — |
| IBP, °C. | — | — | 33 | — | — | — | — | −17 | — | — |
| IBP - 182° C., wt % | — | — | 21.8 | — | — | — | — | 20.8 | — | — |
| 182° C.–343° C., wt % | — | — | 60.7 | — | — | — | — | 59.6 | — | — |
| 343° C.$^+$, wt % | — | — | 17.5 | — | — | — | — | 18.6 | — | — |
| FBP, °C. | — | — | 509 | — | — | — | — | 520 | — | — |
| JP-4 Fraction, wt % | — | — | 48.0 | — | — | — | — | 46.2 | — | — |
| Gas rate, SCFB × 10$^3$ | — | — | 17.2 | — | — | — | — | 11.5 | — | — |
| Hydrogen consumption, SCFB | — | — | 1,540 | — | — | — | — | 1,505 | — | — |
| Wt % recovered | — | — | 100.5 | — | — | — | — | 100.7 | — | — |
| Wt % C$_1$–C$_4$ on Feed | — | — | 3.9 | — | — | — | — | 3.7 | — | — |

The results of Test No. 4 demonstrate that Catalyst D provided satisfactory hydrodenitrogenation and hydrocracking when compared with the performance of Catalyst A.

EXAMPLE V

A fifth catalyst, hereinafter identified as Catalyst E, was prepared and tested for its ability to hydrodenitrogenate and hydrocrack Feed No. 1.

A crystalline borosilicate prepared by ArChem Company was determined by X-ray diffraction analysis to be crystalline AMS-1B borosilicate.

A 90-gram portion of the hydrogen form of AMS-1B was suspended in sufficient distilled water (approximately 150 milliliters) to obtain a mixture having a sauce-like consistency. This mixture was then added to 3,600 grams of PHF-alumina sol (10 wt% solids), obtained from the American Cyanamid Company. The resulting composite was then thoroughly mixed and 400 milliliters of a solution that was prepared by mixing equal amounts of concentrated ammonium hydroxide and distilled water were added and mixed to provide a gel. The resulting gel was removed from the mixer and placed in a large pan and dried in an oven at a temperature of 250° F. (121° C.) for at least an hour. A second batch was prepared exactly as the first batch described hereinabove. After both batches were dried, they were mixed together and ground to pass through a 100-mesh screen (Tyler). This 100-mesh material was mulled with distilled water and extruded to form 5/64-inch extrudates and the extrudates were dried at 250° F. (121° C.) for at least an hour and subsequently in air overnight (approximately 16 hours) at a temperature of 1,000° F. (538° C.). During the mulling procedure for the formation of the extrudates, the fine powder became too wet and some additional PHF-alumina was added to the material to dry it.

A 294-gram portion of the calcined extrudates was impregnated with a solution that had been prepared by dissolving 66.4 grams of (NH$_4$)$_2$Cr$_2$O$_7$ in 270 milliliters of distilled water. The excess liquid was decanted and the impregnated material was calcined overnight (approximately 16 hours) in air at a temperature of 1,000° F. (538° C.). The following morning, the excess liquid was added to the catalyst and the material was calcined again. The calcined material was then impregnated with a solution that had been prepared by dissolving 73.6 grams of (NH$_4$)$_6$Mo$_7$O$_{24}$.4H$_2$O in 200 milliliters of distilled water. The impregnated material was calcined at 1,000° F. (538° C.) over the weekend (approximately 64 hours).

A 190-gram portion of the molybdenum-containing catalyst was impregnated with a solution that had been prepared by dissolving 11.65 grams of Co(NO$_3$)$_2$.6H$_2$O in 100 milliliters of distilled water. The resulting material was calcined at a temperature of 1,000° F. (538° C.) for at least 1 hour and then ground and screened to a 14/20-mesh material, i.e., a material that would pass through a 14-mesh screen (Tyler) but be retained upon a 20-mesh screen (Tyler).

The resultant catalyst, Catalyst E, was prepared to contain 1.5 wt% CoO, 10 wt% Cr$_2$O$_3$, and 15 wt% MoO$_3$ on a support comprising 20 wt% hydrogen-form AMS-1B crystalline borosilicate.

A 20-cubic centimeter portion of Catalyst E was loaded into a reactor of a small-scale test unit and was tested for its ability to hydrodenitrogenate and hydrocrack Feed No. 1. The results of this test, Test No. 5, are presented hereinbelow in Table VI.

TABLE VI

| | DATA FOR TEST NO. 5, CATALYST E | | | | | | | | | | |
|---|---|---|---|---|---|---|---|---|---|---|---|
| Hours on Stream | 20 | 44 | 68 | 92 | 116 | 140 | 164 | 188 | 212 | 236 | 260 |
| Temp., °F. | — | — | 780 | 780 | 780 | 780 | 780 | — | — | 781 | 782 |

TABLE VI-continued

| | DATA FOR TEST NO. 5, CATALYST E | | | | | | | | | | |
|---|---|---|---|---|---|---|---|---|---|---|---|
| Hours on Stream | 20 | 44 | 68 | 92 | 116 | 140 | 164 | 188 | 212 | 236 | 260 |
| °C. | — | — | 416 | 416 | 416 | 416 | 416 | — | — | 417 | 417 |
| Pressure, psig | 1,800 | 1,800 | 1,800 | 1,800 | 1,800 | 1,800 | 1,800 | 1,800 | 1,800 | 1,800 | 1,800 |
| kPa | 12,514 | 12,514 | 12,514 | 12,514 | 12,514 | 12,514 | 12,514 | 12,514 | 12,514 | 12,514 | 12,514 |
| LHSV, hr$^{-1}$ | 0.5 | 0.5 | 0.5 | 0.5 | 0.5 | 0.5 | 0.5 | 0.5 | 0.5 | 0.5 | 0.5 |
| Gravity, °API | 42.5 | 42.0 | 41.8 | 42.7 | 41.0 | 41.2 | 42.2 | 39.4 | 38.3 | 39.4 | 41.0 |
| Carbon, wt % | — | — | — | 86.12 | — | — | — | — | — | — | 86.3 |
| Hydrogen, wt % | — | — | — | 13.87 | — | — | — | — | — | — | 13.7 |
| Nitrogen, ppm | 16 | 5 | 5 | 5 | 4 | 4 | 3 | 359 | 425 | 81 | 27 |
| Sulfur, ppm | 205 | 121 | 23 | 47 | 14 | 10 | — | 208 | 301 | 264 | 90 |
| Pour Point, °F. | — | — | — | −60 | — | — | — | — | — | — | −30 |
| °C. | — | — | — | −51 | — | — | — | — | — | — | −34 |
| Viscosity, cst (40° C.) | — | — | — | 2.22 | — | — | — | — | — | — | 2.34 |
| IBP, °C. | — | — | — | −4 | — | — | — | — | — | — | −26 |
| IBP - 182° C., wt % | — | — | — | 22.0 | — | — | — | — | — | — | 19.4 |
| 182° C.-343° C., wt % | — | — | — | 59.7 | — | — | — | — | — | — | 60.1 |
| 343° C.+, wt % | — | — | — | 18.3 | — | — | — | — | — | — | 20.5 |
| FBP, °C. | — | — | — | 486 | — | — | — | — | — | — | 490 |
| JP-4 Fraction, wt % | — | — | — | 48.0 | — | — | — | — | — | — | 44.4 |
| Gas rate, SCFB × 10$^3$ | — | — | — | 12.9 | — | — | — | — | — | — | 15.1 |
| Hydrogen consumption, SCFB | — | — | — | 1,610 | — | — | — | — | — | — | 1,510 |
| Wt % recovered | — | — | — | 102.3 | — | — | — | — | — | — | 101 |
| Wt % C$_1$-C$_4$ on Feed | — | — | — | 4.7 | — | — | — | — | — | — | 4.7 |

The results of Test No. 5, show that Catalyst E is a very good catalyst for the hydrodenitrogenation and hydrocracking of the whole shale oil.

EXAMPLE VI

A sixth catalyst, Catalyst F, was prepared and tested for its ability to hydrodenitrogenate and hydrocrack Feed No. 1.

A 90-gram portion of Zeolon-H synthetic mordenite molecular sieves, obtained from the Norton Chemical Company, was ground and screened to pass through a 100-mesh screen (Tyler). This 100-mesh material was then made into a slurry by adding distilled water and the resulting slurry was added at one time to 3,600 grams of PHF-alumina sol (10 wt% solids), obtained from the American Cyanamid Company, in a large blender. The resulting mixture was blended for 15 minutes. Then 250 cubic centimeters of a solution prepared by mixing equal amounts of distilled water and concentrated ammonium hydroxide were added thereto. The resulting material was blended immediately until solid appeared. The above procedure was repeated and the material obtained therefrom was combined with that obtained from the first batch. The combined product was dried at a temperature of 250° F. (121° C.) in circulating air over the weekend (approximately 64 hours).

The resulting dried material was ground and screened to pass through 100-mesh screen (Tyler) and then mulled with distilled water and formed into 5/64-inch extrudates which were dried in air for 2 hours at a temperature of 250° F. (121° C.). The dried extrudates were calcined for at least 4 hours at a temperature of 1,000° F. (538° C.).

The calcined material was impregnated with a solution that had been prepared by dissolving 33.2 grams of $(NH_4)_2Cr_2O_7$ in 140 cubic centimeters of distilled water. A 147-gram portion of the calcined extrudates was used. The resulting composite was allowed to stand for approximately 1 hour and dried under a heat lamp. The dried material was impregnated with a solution that had been prepared by dissolving 36.8 grams of ammonium molybdate in distilled water and then 11.65 grams of cobalt nitrate in the solution, sufficient water being used to result in a final volume of 120 cubic centimeters. The solution was added to the catalytic material and the mixture was allowed to stand for 1 hour. The material was dried under a heat lamp and calcined for at least 1 hour in air at a temperature of 1,000° F. (538° C.). This catalyst, Catalyst F, was prepared to contain 1.5 wt% CoO, 10 wt% $Cr_2O_3$, and 15 wt% $MoO_3$ on a support comprising 20 wt% hydrogen-form Zeolon and alumina.

A 20-cubic centimeter portion of Catalyst F was loaded into a test reactor and tested in a small-scale test unit for its ability to hydrodenitrogenate and hydrocrack Feed No. 1. The results of this test, Test No. 6, are presented hereinbelow in Table VII.

TABLE VII

| | DATA FOR TEST NO. 6, CATALYST F | | | | | | |
|---|---|---|---|---|---|---|---|
| Hours on Stream | 20 | 44 | 68 | 92 | 116 | 140 | 164 |
| Temp., °F. | 780 | — | — | 780 | 780 | 779 | 780 |
| °C. | 416 | — | — | 416 | 416 | 415 | 416 |
| Pressure, psig | 1,800 | 1,800 | 1,800 | 1,800 | 1,800 | 1,800 | 1,800 |
| kPa | 12,514 | 12,514 | 12,514 | 12,514 | 12,514 | 12,514 | 12,514 |
| LHSV, hr$^{-1}$ | 0.5 | 0.5 | 0.5 | 0.5 | 0.5 | 0.5 | 0.5 |
| Gravity, °API | 38.8 | 38.3 | 38.2 | 38.0 | 39.0 | 38.4 | 38.2 |
| Carbon, wt % | — | — | — | — | 86.2 | — | — |
| Hydrogen, wt % | — | — | — | — | 13.7 | — | — |
| Nitrogen, ppm | 85 | 80 | 84 | 86 | 57 | 60 | 72 |

TABLE VII-continued

| | DATA FOR TEST NO. 6, CATALYST F | | | | | | |
|---|---|---|---|---|---|---|---|
| Hours on Stream | 20 | 44 | 68 | 92 | 116 | 140 | 164 |
| Sulfur, ppm | 306 | 230 | 122 | 84 | 70 | 140 | 141 |
| Pour Point, °F. | — | — | — | — | 65 | — | — |
| °C. | — | — | — | — | 18 | — | — |
| Viscosity, cst (40° C.) | — | — | — | — | 3.27 | — | — |
| IBP, °C. | — | — | — | — | 11 | — | — |
| IBP - 182° C., wt % | — | — | — | — | 14.3 | — | — |
| 182° C.-343° C., wt % | — | — | — | — | 57.7 | — | — |
| 343° C.+, wt % | — | — | — | — | 28.0 | — | — |
| FBP, °C. | — | — | — | — | 501 | — | — |
| JP-4 Fraction, wt % | — | — | — | — | 35.3 | — | — |
| Gas rate, SCFB × 10$^3$ | — | — | — | — | 8.0 | — | — |
| Hydrogen consumption, SCFB | — | — | — | — | 1,450 | — | — |
| Wt % recovered | — | — | — | — | 98.6 | — | — |
| Wt % C$_1$-C$_4$ on Feed | — | — | — | — | 3.1 | — | — |

The results shown in Table VII indicate that Catalyst F does not provide as much hydrodenitrogenation as the other catalysts discussed hereinabove. In addition, it does provide as much hydrocracking of the shale oil as does Catalyst C.

EXAMPLE VII

A seventh catalyst, Catalyst G, was prepared and tested for its ability to hydrodenitrogenate and hydrocrack Feed No. 1.

A 90-gram portion of low-soda Diuturnal-Y-33-200 crystalline molecular sieve, obtained from the Linde Division of Union Carbide Corporation, in the form of 100-mesh material, that is, a material that would pass through a 100-mesh screen (Tyler), was made into a paste by the addition of distilled water and blended with 3,600 grams of PHF-alumina sol (approximately 10 wt% alumina) in a large blender. The PHF-alumina sol was obtained from the American Cyanamid Company. The resulting mixture was blended for about 15 minutes. Then 250 cubic centimeters of a solution prepared by mixing equal amounts of distilled water and concentrated ammonium hydroxide were added thereto. The resulting material was blended until a solid appeared. The above procedure was repeated and the material obtained from the second preparation was combined with that obtained from the first. The combined product was dried in an oven in air at a temperature of 250° F. (121° C.) overnight (approximately 16 hours).

The resulting dried material was ground and screened to pass through a 100-mesh screen (Tyler) and then mulled with distilled water and formed into 5/64-inch extrudates, which were dried in air in an oven overnight (approximately 16 hours) at a temperature of 250° F. (121° C.) and calcined in air at a temperature of 1,000° F. (538° C.) for at least 1 hour.

The calcined material was impregnated with a solution that had been prepared by adding 66.4 grams of (NH$_4$)$_2$Cr$_2$O$_7$ to 200 milliliters of distilled water and subsequently adding sufficient water to bring the volume of the resulting solution to 250 cubic centimeters. A 294-gram portion of the calcined extrudates was used. The resulting composite was allowed to stand for approximately 1 hour and dried under a heat lamp. The material was then dried in an oven overnight (approximately 16 hours) at a temperature of 250° F. (121° C.) and calcined in an oven in air at a temperature of 1,000° F. (538° C.) for at least 1 hour. A 166-gram portion of the dried material was impregnated with a solution that had been prepared by dissolving 36.8 grams of ammonium molybdate in water and 11.65 grams of cobalt nitrate in the resulting solution, sufficient water being used to result in a final volume of 110 cubic centimeters. The solution was added to the catalytic material and the mixture was allowed to stand for 1 hour. The material was then dried under a heat lamp and calcined for at least 1 hour in air at a temperature of 1,000° F. (538° C.). This catalyst, Catalyst G, was prepared to contain 1.5 wt% CoO, 10 wt% Cr$_2$O$_3$, and 15 wt% MoO$_3$ on a support comprising 20 wt% Diuturnal-Y molecular sieves and alumina.

A 20-cubic centimeter portion of Catalyst G was loaded into a test reactor and tested in a small-scale test unit for its ability to hydrodenitrogenate and hydrocrack Feed No. 1. The results of this test, Test No. 7, are presented hereinbelow in Table VIII.

TABLE VIII

| | DATA FOR TEST NO. 7, CATALYST G | | | | | | | | | | | |
|---|---|---|---|---|---|---|---|---|---|---|---|---|
| Hours on stream | 19 | 43 | 67 | 91 | 115 | 139 | 163 | 187 | 211 | 235 | 259 | 285 |
| Temp., °F. | 781 | — | — | 779 | 779 | 779 | 779 | 779 | — | — | 779 | 779 |
| °C. | 416 | — | — | 415 | 415 | 415 | 415 | 415 | — | — | 415 | 415 |
| Pressure, psig | 1,800 | 1,800 | 1,800 | 1,800 | 1,800 | 1,800 | 1,800 | 1,800 | 1,800 | 1,800 | 1,800 | 1,800 |
| kPa | 12,514 | 12,514 | 12,514 | 12,514 | 12,514 | 12,514 | 12,514 | 12,514 | 12,514 | 12,514 | 12,514 | 12,514 |
| LHSV, hr$^{-1}$ | 0.5 | 0.5 | 0.5 | 0.5 | 0.5 | 0.5 | 0.5 | 0.5 | 0.5 | 0.5 | 0.5 | 0.5 |
| Gravity, °API | 45.2 | 43.9 | 41.2 | 39.4 | 39.0 | 38.7 | 38.9 | 38.9 | 38.6 | 38.8 | 38.8 | 38.8 |
| Carbon, wt % | — | — | — | — | 86.3 | — | — | — | — | — | — | 86.3 |
| Hydrogen, wt % | — | — | — | — | 13.7 | — | — | — | — | — | — | 13.7 |
| Nitrogen, ppm | 27 | 9 | 7 | 9 | 23 | 37 | 29 | 29 | 27 | 32 | 29 | 48 |
| Sulfur, ppm | 420 | 720 | 254 | 328 | 115 | 232 | 256 | 367 | 930 | — | 40 | 165 |
| Pour Point, °F. | — | — | — | — | 75 | — | — | — | — | — | — | 75 |
| °C. | — | — | — | — | 24 | — | — | — | — | — | — | 24 |

TABLE VIII-continued

DATA FOR TEST NO. 7, CATALYST G

| Hours on stream | 19 | 43 | 67 | 91 | 115 | 139 | 163 | 187 | 211 | 235 | 259 | 285 |
|---|---|---|---|---|---|---|---|---|---|---|---|---|
| Viscosity, cst (40° C.) | — | — | — | — | 3.29 | — | — | — | — | — | — | 3.58 |
| IBP, °C. | — | — | — | — | 45 | — | — | — | — | — | — | 73 |
| IBP - 182° C., wt % | — | — | — | — | 14.5 | — | — | — | — | — | — | 13.4 |
| 182° C.–343° C., wt % | — | — | — | — | 60.6 | — | — | — | — | — | — | 59.0 |
| 343° C.+, wt % | — | — | — | — | 24.9 | — | — | — | — | — | — | 27.6 |
| FBP, °C. | — | — | — | — | 506 | — | — | — | — | — | — | 469 |
| JP-4 Fraction, wt % | — | — | — | — | 37.8 | — | — | — | — | — | — | 35.7 |
| Gas rate, SCFB × 10³ | — | — | — | — | 12.8 | — | — | — | — | — | — | 13.4 |
| Hydrogen consumption, SCFB | — | — | — | — | 1,380 | — | — | — | — | — | — | 1,390 |
| Wt % recovered | — | — | — | — | 99 | — | — | — | — | — | — | 100 |
| Wt % C₁-C₄ on Feed | — | — | — | — | 2.5 | — | — | — | — | — | — | 2.5 |

The results shown in Table VIII indicate that Catalyst G provides somewhat better hydrodenitrogenation than Catalyst F and hydrocracking that is similar to that provided by Catalysts C and F.

The data that were obtained from those periods of the above-described tests in which weight balances were made are summarized in Table IX hereinbelow.

TABLE IX

SUMMARY OF RESULTS
PROPERTIES OF PRODUCT

| Test No. | Period No. | Catalyst | Nitrogen, ppm | Pour Point, °C. | JP-4 Wt % |
|---|---|---|---|---|---|
| 1 | 7 | A | 110 | 27 | 38.1 |
| 2 | 5 | B | 15 | −1 | 59.5 |
| 2 | 12 | B | 14 | 7 | 52.1 |
| 3 | 6 | C | 31 | 24 | 34.4 |
| 4 | 3 | D | 45 | −26 | 48.0 |
| 4 | 8 | D | 34 | −23 | 46.2 |
| 5 | 4 | E | 5 | −51 | 48.0 |
| 5 | 11 | E | 27 | −34 | 44.4 |
| 6 | 5 | F | 57 | 18 | 35.3 |
| 7 | 5 | G | 23 | 24 | 37.8 |
| 7 | 12 | G | 48 | 24 | 35.7 |

It is interesting to note that each of the molecular sieve-containing catalysts provided better hydrodenitrogenation of the shale oil than Catalyst A, the comparative prior-art catalyst which did not contain a molecular sieve zeolite component, and at least comparable hydrocracking. Hence, each, when employed in the process of the present invention, provides an operable and an improved process.

Catalysts B, C, D, E, and G provide excellent overall performance when converting the above-described shale oil. Each performs in an overall manner that is superior to that of the standard catalyst, Catalyst A. While any one of the catalysts discussed hereinabove, except Catalyst A, can be used in the process of the present invention, Catalysts B, C, D, E, and G are preferred.

EXAMPLE VIII

An eighth catalyst, Catalyst H, was prepared and tested for its ability to hydrodenitrogenate and hydrocrack Feed No. 2, a shale oil, the properties of which are presented hereinafter in Table X.

TABLE X

PROPERTIES OF FEEDS NOS. 2 AND 3

| Feed No. | 2 | 3 |
|---|---|---|
| Carbon, wt % | 85.86 | 85.18 |
| Hydrogen, wt % | 11.49 | 11.66 |
| Nitrogen, wt % | 1.38 | 0.166 |
| Sulfur, wt % | 0.73 | 2.99 |
| Oxygen, wt % | 0.53 | — |
| Bromine No., gm/100 ml | 56 | — |
| Gravity, °API | 28.4 | 18.6 |
| Pour Point, °F. | 35 | 110 |
| °C. | 1.7 | 43 |
| Viscosity, cst (100° C.) | 1.38 | 11.68 |
| 650° F. + material, wt % | 30.1 | 98.0 |
| Simulated Distillation (Sim. Dist.), °F. (°C.) | | |
| IBP | 138 (59) | 409 (209) |
| 5% | 228 (109) | 671 (355) |
| 10% | 271 (133) | 727 (386) |
| 20% | 333 (168) | 788 (420) |
| 30% | 388 (198) | 829 (443) |
| 40% | 444 (229) | 863 (462) |
| 50% | 498 (259) | 892 (478) |
| 60% | 567 (297) | 918 (492) |
| 70% | 658 (348) | 945 (507) |
| 80% | 763 (406) | 977 (525) |
| 90% | 864 (462) | 1,000 (538) |
| 95% | 943 (506) | — |
| 98% | 1,018 (548) | — |
| Hydrocarbon Type Analysis (Mass Spectra), wt % | | |
| Paraffins | — | 19.7 — |
| Naphthenes | — | 34.7 — |
| Monoaromatics | — | 12.6 — |
| Polyaromatics & Heterocyclics | — | 33.0 — |

A 90-gram portion of commercially-available rare earth metal-exchanged Y-type molecular sieves was ground and screened to pass through a 100-mesh screen (Tyler), made up into a paste by the addition of distilled water, and added to 3,600 grams of a PHF-alumina sol (approximately 10 wt% solids) obtained from the American Cyanamid Company. The molecular sieves had been obtained from the Davison Chemical Division of W. R. Grace and Co. The resulting mixture was blended in a large blender for 15 minutes. Then 250 cubic centimeters of a solution that had been prepared by mixing equal amounts of distilled water and concentrated ammonium hydroxide were added to the blend to gel the sol. Two of these batches were made and subsequently combined and dried at a temperature of about 250° F. (121° C.) for approximately 64 hours (over the weekend) in circulating air. The dried material was then ground and sieved to a 100-mesh material (Tyler), mulled with distilled water, and extruded as 5/64-inch (0.2 centimeter) extrudates. The extrudates were dried for 2 hours at a temperature of about 250° F. (121° C.) and then calcined in air at a temperature of about 1,000° F. (538° C.) for 2 hours. This catalytic support material was prepared to contain 20 wt% rare earth metal-exchanged Y-type molecular sieves in a matrix of alumina.

A 143-gram portion of the above support material was added to a solution that had been prepared by dissolving 33.2 grams of $(NH_4)_2Cr_2O_7$ in 100 milliliters of distilled water. This mixture was then permitted to stand for 1 hour, again mixed, and then dried in an oven at a temperature of about 250° F. (121° C.) for 2 hours. The dried material was calcined in air overnight (approximately 16 hours) at a temperature of about 1,000° F. (538° C.). The calcined chromium-containing material was subsequently impregnated with a solution that had been prepared by dissolving 27.25 grams of $Ni(NO_3)_2 \cdot 6H_2O$ and 36.80 grams of $(NH_4)_6Mo_7O_{24} \cdot 4H_2O$ in 90 milliliters of distilled water. The solution and support material were thoroughly mixed and the mixture was allowed to stand for approximately 1 hour, after which the composite was mixed again and placed in an oven for 2 hours at a temperature of approximately 250° F. (121° C.). The dried material was subsequently calcined overnight (approximately 16 hours) at a temperature of about 1,000° F. (538° C.).

The finished catalytic material, Catalyst H, was prepared to contain 3.5 wt% NiO, 15 wt% $MoO_3$, and 10 wt% $Cr_2O_3$.

A 14.4-cubic centimeter sample of Catalyst H, as 14/20-mesh particles (U.S. Sieve Series), was charged to the reactor of a bench-scale test unit as described hereinabove and was tested for its ability to hydrodenitrogenate and hydrocrack the shale oil identified as Feed No. 2. The results of this test, Test No. 8, are presented hereinbelow in Table XI.

TABLE XI

DATA FOR TEST NO. 8, CATALYST H, FEED NO. 2

| Hours on Stream | 108 | 180 | 300 |
|---|---|---|---|
| Temperature, °F. | 760 | 760 | 780 |
| °C. | 404 | 404 | 416 |
| Pressure, psig | 1,800 | 1,800 | 1,800 |
| kPa | 12,514 | 12,514 | 12,514 |
| Hydrogen, SCFB | 10,040 | 10,590 | 10,520 |
| LHSV, hr$^{-1}$ | 0.5 | 0.5 | 0.5 |
| Product Properties | | | |
| Gravity, °API | 40.4 | 40.3 | 43.5 |
| Pour Point, °F. | | 50 | 25 |
| °C. | | 10 | −3.9 |
| Viscosity, cst (40° C.) | | 2.12 | 1.62 |
| Carbon, wt % | | 86.45 | 86.28 |
| Hydrogen, wt % | | 13.53 | 13.72 |
| Sulfur, ppm | | 19 | 9 |
| Nitrogen, ppm | 174 | 206 | 2 |
| Sim. Dist., °F. (°C.) | | | |
| IBP | | 178 (81) | 163 (73) |
| 5% | 244 | (118) | 237 (114) |
| 20% | | 328 (165) | 308 (153) |
| 50% | | 454 (236) | 424 (218) |
| 80% | | 630 (332) | 570 (299) |
| 95% | | 803 (439) | 743 (395) |
| Product Yield, wt % | | | |
| $C_1$-$C_4$ | | 2.4 | 5.5 |
| IBP - 182° C. | | 27.0 | 32.1 |
| 182°-343° C. | | 53.2 | 51.9 |
| 343° C.+ | 17.4 | | 10.5 |

The results shown in Table XI indicate that Catalyst H does provide very good hydrodesulfurization, hydrodenitrogenation, and hydrocracking of Feed No. 2, a shale oil. Hydrocracking is measured by the conversion of the 650° F.+ feed to 650° F.− products.

EXAMPLE IX

Catalyst H was also tested for its ability to convert a heavy vacuum gas oil, Feed No. 3. The properties of Feed No. 3 are presented hereinabove in Table X.

A 16-cubic centimeter portion of Catalyst H was loaded into a test reactor and tested with Feed No. 3 in a bench-scale test unit as described hereinabove. The results of this test, Test No. 9, are presented hereinbelow in Table XII.

TABLE XII

DATA FOR TEST NO. 9, CATALYST H, FEED NO. 3

| Hours on Stream | 88 | 112 | 160 | 256 | 424 | 496 |
|---|---|---|---|---|---|---|
| Temperature, °F. | 740 | 780 | 780 | 780 | 770 | 740 |
| °C. | 393 | 416 | 416 | 416 | 410 | 393 |
| Pressure, psig | 1,800 | 1,800 | 1,800 | 1,800 | 1,800 | 1,800 |
| kPa | 12,514 | 12,514 | 12,514 | 12,514 | 12,514 | 12,514 |
| Hydrogen, SCFB | 11,950 | 13,780 | 9,460 | 19,340 | 20,200 | 9,920 |
| LHSV, hr$^{-1}$ | 1.25 | 1.25 | 1.25 | 0.625 | 0.625 | 1.25 |
| Product Properties | | | | | | |
| Gravity, °API | 27.7 | | 31.1 | 51.2 | 33.2 | 26.0 |
| Pour Point, °F. | 90 | | 95 | −70 | 85 | 105 |
| °C. | 32.2 | | 35 | −56.7 | 29.4 | 41 |
| Viscosity, cst (100° C.) | 5.68 | | 2.85 | 0.82 | 1.90 | 5.81 |
| Carbon, wt % | 86.97 | | 87.18 | 86.09 | 87.06 | 87.11 |
| Hydrogen, wt % | 12.90 | | 12.78 | 13.89 | 12.93 | 12.68 |
| Sulfur, ppm | | 125 | 190 | 254 | 52 | 1,270 |
| Nitrogen, ppm | 535 | | 123 | 2 | 22 | 799 |
| Sim. Dist., °F. (°C.) | | | | | | |
| IBP | 295 (146) | | 117 (47) | −29 (−34) | 117 (47) | 104 (40) |
| 5% | 510 (266) | | 284 (140) | 115 (46) | 242 (117) | 270 (132) |
| 20% | 688 (365) | | 525 (274) | 199 (93) | 438 (226) | 582 (305) |
| 50% | 817 (436) | | 747 (397) | 295 (146) | 653 (345) | 798 (426) |
| 80% | 917 (492) | | 886 (475) | 415 (213) | 842 (450) | 930 (499) |
| 95% | 994 (534) | | 971 (522) | 536 (280) | 845 (452) | — — |
| Product Yield, wt % | | | | | | |

TABLE XII-continued

| | DATA FOR TEST NO. 9, CATALYST H, FEED NO. 3 | | | | | |
|---|---|---|---|---|---|---|
| Hours on Stream | 88 | 112 | 160 | 256 | 424 | 496 |
| $C_1$-$C_4$ | 0.6 | | 1.6 | 9.7 | 2.9 | 0.5 |
| IBP - 182° C. | 1.3 | | 8.2 | 61.2 | 12.4 | 8.4 |
| 182°–343° C. | 13.3 | | 24.6 | 28.4 | 35.7 | 17.9 |
| 343° C.+ | 84.8 | | 65.6 | 0.7 | 49.0 | 73.2 |

The data presented in Table XII indicate that Catalyst H provides substantial hydrodesulfurization, hydrodenitrogenation, and hydrocracking of this heavy vacuum gas oil, Feed No. 3.

EXAMPLE X

A ninth catalyst, Catalyst I, was prepared and tested for its ability to hydrodenitrogenate and hydrocrack Feed No. 2, the shale oil.

A 359.71-gram portion of the rare earth metal-exchanged Y-type molecular sieves obtained from Davison Chemical Division of W. R. Grace and Co. was ground and screened to pass through a 100-mesh screen (Tyler) and mixed with 700 milliliters of distilled water. The resulting paste was added to 3,558 grams of a PHF-alumina sol (approximately 10 wt% solids) obtained from the American Cyanamid Company. The resulting composite was blended for 10 minutes. Then a solution prepared by adding 200 milliliters of concentrated ammonium hydroxide to 200 milliliters of distilled water was rapidly added to the blended material to form a gel. The gel was subsequently dried in air in an oven for 42 hours at a temperature of about 250° F. (121° C.). The dried material was then ground to pass through a 100-mesh screen (Tyler). The ground material was mulled with distilled water and extruded as 5/64-inch (0.2-centimeter) extrudates, which were dried overnight (approximately 16 hours) in air at a temperature of about 250° F. (121° C.) and then calcined in air at a temperature of about 1,000° F. (538° C.) for 4 hours.

A 143-gram portion of this support material, which was prepared to contain 50 wt% molecular sieves in a matrix of alumina, was added to a solution that had been prepared by dissolving 33.2 grams of $(NH_4)_2Cr_2O_7$ in 130 milliliters of distilled water. After the excess liquid was removed under a heat lamp, the impregnated material was dried in an oven in air for at least 2 hours at a temperature of about 250° F. (121° C.) and then calcined in air for 2 hours at a temperature of about 1,000° F. (538° C.). The calcined chromium-containing material was then impregnated with a solution that had been prepared by first dissolving 36.8 grams of $(NH_4)_6Mo_7O_{24}.4H_2O$ in 120 milliliters of water to form a molybdenum-containing solution and then dissolving 27.25 grams of $Ni(NO_3)_2.6H_2O$ in the molybdenum-containing solution. The excess liquid was removed under a heat lamp, and the material was then dried in air in an oven at a temperature of about 250° F. (121° C.) for at least 2 hours and calcined in air for 2 hours at a temperature of about 1,000° F. (538° C.). The finished Catalyst I was prepared to contain 3.5 wt% NiO, 10 wt% $Cr_2O_3$, and 15 wt% $MoO_3$.

A 14.4-cubic centimeter sample of Catalyst I in the form of 14/20-mesh particles (U.S. Sieve Series), was charged to the reactor of a bench-scale test unit as described hereinabove and was tested for its ability to hydrodenitrogenate and hydrocrack Feed No. 2. The results of this test, Test No. 10, are presented hereinbelow in Table XIII.

TABLE XIII

| DATA FOR TEST NO. 10, CATALYST I, FEED NO. 2 | | | | |
|---|---|---|---|---|
| Hours on Stream | 156 | 204 | 276 | 324 |
| Temperature, °F. | 760 | 780 | 780 | 780 |
| °C. | 404 | 416 | 416 | 416 |
| Pressure, psig | 1,800 | 1,800 | 1,800 | 1,800 |
| kPa | 12,514 | 12,514 | 12,514 | 12,514 |
| LHSV, hr$^{-1}$ | 0.5 | 0.5 | 0.5 | 0.5 |
| Hydrogen, SCFB | 8,354 | 11,336 | 12,831 | 9,000 |
| Product Properties | | | | |
| Gravity, °API | 40.4 | 43.3 | 47.4 | 48.0 |
| Pour Point, °F. | 50 | | | −50 |
| °C. | 10 | | | −45.6 |
| Viscosity, cst (40° C.) | — | | | 1.21 |
| Carbon, wt % | 86.34 | | | 86.05 |
| Hydrogen, wt % | 13.63 | | | 13.95 |
| Sulfur, ppm | 241 | | | 9 |
| Nitrogen, ppm | 185 | 2.3 | 2.9 | 1.3 |
| Sim. Dist., °F. (°C.) | | | | |
| IBP | 179 (82) | | | 160 (71) |
| 5% | 243 (118) | | | 208 (98) |
| 20% | 320 (160) | | | 270 (132) |
| 50% | 449 (232) | | | 356 (180) |
| 80% | 635 (335) | | | 469 (243) |
| 95% | 802 (428) | | | 610 (321) |
| Product Yield, wt % | | | | |
| $C_1$-$C_4$ | 2.5 | | | 6.8 |
| IBP - 182° C. | 27.9 | | | 47.5 |
| 182°–343° C. | 42.0 | | | 42.8 |
| 343° C.+ | 27.6 | | | 2.8 |

The results presented in Table XIII demonstrate that Catalyst I is suitable for hydrodesulfurization, hydrodenitrogenation, and hydrocracking of Feed No. 2, a shale oil.

Catalysts H and I are preferred embodiments of the catalyst of the present invention.

They, as well as the other preferred catalysts of the present invention, are not only suitable for the conversion of whole shale oils and any fraction thereof, but also are suitable for the hydrodenitrogenation and hydrocracking of other distillate hydrocarbon streams containing high concentrations of nitrogen, such as hydrocarbons derived from coal, hydrocarbons derived from tar sands, and petroleum hydrocarbon distillates.

Another embodiment of the process of the present invention is a process for the hydrodenitrogenation and hydrocracking of a heavy hydrocarbon stream containing a substantial amount of nitrogen compounds to produce motor fuel components, heater oil components, and a feedstock for a catalytic cracking unit. Those hydrocarbon streams containing a substantial amount of nitrogen compounds that are potential feedstocks for catalytic cracking units include, but are not limited to, light and heavy vacuum gas oils, coker gas oils, certain fractions of shale oil, tar sands oil, and coal liquids, particularly those boiling in the range of about 600° F. (316° C.) to about 1,000° F. (538° C.), and mixtures thereof. Cycle oils and decanted oils can be used as catalytic cracker feedstocks, but a substantially greater amount of hydrogen is required to hydrotreat effectively these latter streams. Moreover, the hydrotreating is carried out to reduce the nitrogen level to a range of about 400 ppm (0.04 wt%) to about 1,000 ppm (0.1 wt%). Any further reduction is usually unnecessary and may be uneconomical. Such hydrotreating will reduce also the sulfur content to a value within the range of about 0 ppm (0 wt%) to about 5,000 ppm (0.5 wt%) sulfur, preferably, a value that is less than 3,000 ppm (0.3 wt%). Typical cracking catalysts can tolerate these nitrogen and sulfur levels.

Accordingly, there is provided a process for the hydrodenitrogenation and hydrocracking of a heavy hydrocarbon stream containing a substantial amount of nitrogen compounds to produce motor fuel components, heater oil components, and a feedstock for a catalytic cracking unit, which process comprises contacting said stream in a reaction zone under suitable conditions and in the presence of hydrogen with a catalyst comprising a hydrogenation component comprising chromium, molybdenum, and at least one Group VIII metal deposed upon a support comprising a crystalline molecular sieve zeolite selected from the group consisting of an ultrastable, large-pore crystalline aluminosilicate material, a ZSM-5-type crystalline aluminosilicate, an AMS-1B crystalline borosilicate, a crystalline Y-type aluminosilicate, and a rare earth metal-exchanged crystalline Y-type aluminosilicate suspended in and distributed throughout a matrix of catalytically-active alumina, the metals of said hydrogenation component being present in the elemental form, as oxides, as sulfides, or mixtures thereof, said metal of Group VIII being present in an amount within the range of about 0.5 wt% to about 10 wt%, calculated as the oxide of the metal, said molybdenum being present in an amount within the range of about 5 wt% to about 25 wt%, calculated as $MoO_3$, and said chromium being present in an amount within the range of about 3 wt% to about 15 wt%, calculated as $Cr_2O_3$, each amount being based upon the weight of said catalyst, and said molecular sieve zeolite being present in an amount within the range of about 5 wt% to about 90 wt%, based upon the weight of said support. This hydrotreating process produces distillate and reduces the nitrogen content and the sulfur content of the remaining hydrocarbon (gas oil) stream to the above-defined levels that provide superior yields when the stream is catalytically cracked.

As shown hereinabove in Example IX, an embodiment of the process of the present invention is a process for the hydrodenitrogenation and hydrocracking of a hydrocarbon stream containing a substantial amount of nitrogen compounds (a heavy vacuum gas oil) to provide a hydrocarbon stream that contains nitrogen and sulfur levels which a cracking catalyst can tolerate and, hence, that is suitable as feed to a catalytic cracking unit.

The following examples are being presented to demonstrate further the effectiveness of the process of the present invention for the hydrotreating of a hydrocarbon stream containing a substantial amount of nitrogen compounds to provide distillate and a catalytic cracker feed.

EXAMPLE XI

A tenth catalyst, Catalyst J, and an eleventh catalyst, Catalyst K, were prepared and tested for their abilities to hydrotreat Feed No. 3, the heavy vacuum gas oil.

For each of these catalysts, Aero 100A alumina in the form of 1/32-inch (0.079-centimeter) extrudates, obtained from the American Cyanamid Company, after being calcined in air at a temperature of about 1,000° F. (538° C.), was impregnated with an aqueous solution of $(NH_4)_2Cr_2O_7$. The mixture of alumina support material and solution was allowed to stand for a period of time and then was calcined in air at a temperature of about 1,000° F. (538° C.) overnight (approximately 16 hours). The calcined chromium-containing material was impregnated with an aqueous solution of either $Ni(NO_3)_2.6H_2O$ or $Co(NO_3)_2.6H_2O$ and $(NH_4)_6Mo_7O_{24}.4H_2O$. The mixture of solids and solution was permitted to stand for a short period of time and was calcined subsequently at a temperature of about 1,000° F. (538° C.). The finished catalyst was ground to a 16/20-mesh material, i.e., a material that will pass through a 16-mesh screen (Tyler), but will be retained upon a 20-mesh screen (Tyler).

Additional information and data relating to the preparation of Catalysts J and K are presented hereinbelow in Table XIV.

TABLE XIV

| PREPARATION OF CATALYSTS J AND K | | |
|---|---|---|
| Catalyst | J | K |
| Aero 100A $Al_2O_3$, gm | 139 | 147 |
| Calcining Time, hr | — | — |
| Calcining Temp., °C. | 538 | 538 |
| First Impregnation | | |
| $(NH_4)_2Cr_2O_7$, gm | 33.2 | 33.2 |
| Distilled $H_2O$, ml | 135 | 145 |
| Standing Time, hr | 1 | 6 |
| Standing Temp. | room | room |
| Calcining Time, hr | 16 | 16 |
| Calcining Temp., °C. | 538 | 538 |
| Second Impregnation | | |
| $(NH_4)_6Mo_7O_{24}.4H_2O$, gm | 41.71 | 41.71 |
| $Ni(NO_3)_2.6H_2O$, gm | 27.20 | — |
| $Co(NO_3)_2.6H_2O$, gm | — | 11.65 |
| Distilled $H_2O$, ml | 120 | 120[1] |
| Standing Time, hr | 6 | 16 |
| Standing Temp. | room | room |
| Calcining Time, hr | 16 | 5 |
| Calcining Temp., °C. | 538 | 538 |
| Particle Size, mesh (Tyler) | 16/20 | 16/20 |
| Composition, wt % | | |
| $MoO_3$ | 20.0 | 14.6 |
| $Cr_2O_3$ | 10.5 | 9.1 |
| NiO | 3.5 | — |
| CoO | — | 1.5 |
| Surface Area, $m^2$/gm | 170 | — |
| Pore Volume, cc/gm | 0.51 | — |
| Avg. Pore Diameter, nm | 8.4 | — |
| Å | 84 | — |

[1]Sufficient $H_2O$ used to make 120 ml of solution.

EXAMPLE XII

Catalysts J and K were tested subsequently with Feed No. 3. While Catalysts J and K and the others described and tested in the following examples were tested in the same type of equipment and in a manner that was similar to that employed in the previous examples, 10 inches of ⅛-inch (0.32-centimeter) alundum balls were used as a support for the catalyst and such alundum balls were used to fill the space in the reactor above the catalyst bed.

Each of these catalysts, including the ones described and tested in the following examples, were subjected to a sulfiding pretreatment. For such pretreatment, the reactor was first purged with nitrogen for a short period of time after which the temperature of the catalyst bed was raised to about 300° F. (149° C.) and a gas mixture of 8% hydrogen sulfide in hydrogen was passed through the catalyst bed at a pressure of about 300 psi (2,069 kPa) and a rate of about 20 liters per hour. After about one hour had elapsed, the temperature was raised to about 400° F. (204° C.). After an additional hour, the flow of the hydrogen sulfide-in-hydrogen gas mixture was stopped and a flow of hydrogen at a flow rate of 20 liters per hour was established at a pressure of 1,200 psig (8,410 kPa). Hydrocarbon feed was then introduced into the reactor and the temperature of the catalyst bed was raised to the reaction temperature. This pretreatment procedure was carried out for each of the catalysts in the following tests with the exception of Catalyst J in Test No. 12. In that case, after the use of the hydrogen sulfide-in-hydrogen gas mixture at 400° F. (204° C.), the temperature was raised to 700° F. (371° C.) and the gas mixture was employed for an additional hour at 700° F. (371° C.). Then the flow of the gas mixture was stopped and replaced with the hydrogen flow, as in the other tests.

The sulfided Catalyst J was tested for its ability to hydrotreat Feed No. 3 in two tests, Test No. 11 and Test No. 12. The pertinent information and data of these two tests are presented hereinbelow in Table XV and Table XVI, respectively.

TABLE XV

| DATA FOR TEST NO. 11, CATALYST J, FEED NO. 3 | | | |
|---|---|---|---|
| Days on Stream | 5 | 8 | 12 |
| LHSV, hr$^{-1}$ | 1.25 | 1.25 | 1.25 |
| Temp., °F. | 740 | 780 | 780 |
| °C. | 393 | 416 | 416 |
| Hydrogen Pressure, psi | 1,200 | 1,200 | 1,200 |
| kPa | 8,343 | 8,343 | 8,343 |
| Hydrogen Rate, SCFB | 10,500 | 19,000 | 19,000 |
| m$^3$/m$^3$ | 1,870 | 3,384 | 3,384 |
| Product Properties | | | |
| Gravity, °API | 27.0 | 29.6 | 29.4 |
| gm/cc | 0.8927 | | 0.8794 |
| Pour Point, °F. | 100 | — | 100 |
| °C. | 37.8 | — | 37.8 |
| Viscosity at 100° C., cst | 5.47 | — | 3.37 |
| Carbon, wt % | 87.22 | — | 87.23 |
| Hydrogen, wt % | 12.70 | — | 12.73 |
| Sulfur, ppm | 390 | 215 | 150 |
| Nitrogen, ppm | 445 | 160 | 225 |
| Sim. Dist., °F. (°C.) | | | |
| IBP | 272 (133) | — | 208 (98) |
| 5% | 516 (269) | — | 380 (193) |
| 20% | 686 (364) | — | 587 (308) |
| 50% | 813 (434) | — | 759 (404) |
| 80% | 913 (490) | — | 887 (475) |
| 95% | 983 (529) | — | 983 (529) |
| Hydrodesulfurization (HDS), % | 98.7 | 99.3 | 99.5 |
| Hydrodenitrogenation (HDN), % | 73.8 | 91.1 | 86.8 |
| Hydrogen Consumed, SCFB | 625 | — | 680 |
| m$^3$/m$^3$ | 111 | — | 121 |
| Product Yield, wt % | | | |
| C$_1$-C$_4$ | 0.6 | 0.6 | 1.4 |
| IBP - 182° C. | 0.3 | 1.2 | 4.1 |
| 182°-343° C. | 15.6 | 13.7 | 28.2 |
| 343° C.+ | 83.5 | 84.5 | 66.3 |

TABLE XVI

| DATA FOR TEST NO. 12, CATALYST J, FEED NO. 3 | | | | | | |
|---|---|---|---|---|---|---|
| Days on Stream | 4 | 7 | 11 | 14 | 18 | 21 |
| LHSV, hr$^{-1}$ | 0.625 | 0.625 | 0.625 | 0.625 | 0.625 | 0.625 |
| Temp., °F. | 740 | 760 | 780 | 740 | 800 | 740 |
| °C. | 393 | 404 | 416 | 393 | 427 | 393 |
| Pressure, psi | 1,200 | 1,200 | 1,200 | 1,200 | 1,200 | 1,200 |
| kPa | | | | | | |
| Hydrogen Rate, SCFB | 12,000 | 12,000 | 12,000 | 12,000 | 12,000 | 12,000 |
| m$^3$/m$^3$ | 2,137 | 2,137 | 2,137 | 2,137 | 2,137 | 2,137 |
| Product Properties | | | | | | |
| Gravity, °API | 29.2 | 31.4 | 31.1 | 28.8 | 32.9 | 30.0 |
| g/cc | 0.8805 | 0.8686 | 0.8702 | 0.8827 | 0.8607 | 0.8762 |
| Pour Point, °F. | 100 | 100 | 100 | 105 | 95 | 105 |
| °C. | — | — | — | — | — | — |
| Viscosity at 100° C., cst | 3.72 | 3.11 | 2.44 | 4.21 | — | 4.58 |
| Carbon, wt % | 87.11 | 87.09 | 87.14 | 87.09 | 87.22 | 87.20 |
| Hydrogen, wt % | 12.89 | 12.89 | 12.84 | 12.87 | 12.77 | 12.75 |
| Sulfur, ppm | 17 | 89 | 74 | 64 | 61 | 119 |
| Nitrogen, ppm | 89 | 65 | 88 | 241 | 73 | 373 |
| Sim. Dist., °F. (°C.) | | | | | | |
| IBP | 336 (169) | 182 (83) | 248 (120) | 267 (131) | 140 (60) | 245 (118) |
| 5% | 486 (252) | 334 (168) | 387 (197) | 417 (214) | 277 (136) | 472 (244) |
| 20% | 647 (342) | 557 (293) | 556 (291) | 660 (349) | 467 (242) | 667 (353) |
| 50% | 790 (421) | 751 (399) | 718 (381) | 805 (429) | 656 (347) | 809 (432) |

TABLE XVI-continued

| | DATA FOR TEST NO. 12, CATALYST J, FEED NO. 3 | | | | | |
|---|---|---|---|---|---|---|
| Days on Stream | 4 | 7 | 11 | 14 | 18 | 21 |
| 80% | 905 (485) | 888 (476) | 843 (450) | 915 (491) | 798 (426) | 918 (492) |
| 95% | 993 (534) | 980 (527) | 935 (502) | 998 (537) | 899 (482) | 999 (537) |
| HDS, % | 99.9 | 99.7 | 99.8 | 99.8 | 99.8 | 99.6 |
| HDN, % | 94.6 | 96.1 | 94.7 | 85.5 | 95.6 | 77.5 |
| Hydrogen Consumed, SCFB | 765 | 830 | 785 | 745 | 800 | 670 |
| $m^3/m^3$ | 136 | 148 | 140 | 133 | 142 | 119 |
| Product Yield, wt % | | | | | | |
| $C_1$-$C_4$ | 0.9 | 2.2 | 2.2 | 0.7 | 3.4 | 0.9 |
| IBP - 182° C. | 0.3 | 5.9 | 3.4 | 1.8 | 9.9 | 2.1 |
| 182°-343° C. | 20.2 | 25.0 | 31.3 | 16.5 | 36.8 | 15.4 |
| 343° C.+ | 78.6 | 67.0 | 63.1 | 81.0 | 50.0 | 81.5 |

The sulfided Catalyst K was tested for its ability to hydrotreat Feed No. 3 in Test No. 13, the results of which are presented hereinbelow in Table XVII.

TABLE XVII

| DATA FOR TEST NO. 13, CATALYST K, FEED NO. 3 | | | |
|---|---|---|---|
| Days on Stream | 23 | 59 | 79[1] |
| LHSV, $hr^{-1}$ | 1.2 | 1.2 | 1.2 |
| Temp., °F. | 740 | 740 | 740 |
| °C. | 393 | 393 | 393 |
| Hydrogen Pressure, | | | |
| psi | 1,250 | 1,250 | 1,250 |
| kPa | 8,690 | 8,690 | 8,690 |
| Product Properties | | | |
| Gravity, °API | 27.1 | 26.8 | 27.0 |
| gm/cc | 0.8922 | 0.8939 | 0.8927 |
| Sulfur, ppm | 480 | 630 | 1,570 |
| Nitrogen, ppm | 634 | 812 | 1,050 |
| 343° C.+ Product, % | 83.5 | 84.0 | 85.0 |
| Days on Stream | 99 | 106 | 111 |
| LHSV, $hr^{-1}$ | 1.2 | 1.2 | 1.2 |
| Temp., °F. | 740 | 740 | 740 |
| °C. | 393 | 393 | 393 |
| Hydrogen Pressure, | | | |
| psi | 1,250 | 1,250 | 1,250 |
| kPa | 8,690 | 8,690 | 8,690 |
| Product Properties | | | |
| Gravity, °API | 26.8 | 27.2 | 27.0 |
| gm/cc | 0.8939 | 0.8916 | 0.8927 |
| Sulfur, ppm | 660 | 820 | 740 |
| Nitrogen, ppm | 1,180 | 740 | 978 |
| 343° C. Product, % | 85.0 | 81.5 | 84.0 |

[1]Test unit lost hydrogen pressure for several hours about this time.

The results of Tests Nos. 11, 12, and 13 demonstrate the performance of catalysts that do not contain crystalline molecular sieve zeolites when they are being employed to hydrodenitrogenate, hydrodesulfurize, and possibly hydrocrack a heavy vacuum gas oil.

EXAMPLE XIII

Six catalysts, each of which contained nickel, chromium, and molybdenum as hydrogenating metals and a support comprising a crystalline molecular sieve zeolite suspended in and distributed throughout a catalytically active alumina, were prepared and tested subsequently for their abilities to hydrotreat the heavy vacuum gas oil, Feed No. 3. These six catalysts are identified hereinafter as Catalysts L, M, N, O, P, and Q. In general, each of these six catalysts was prepared as described in the following paragraphs.

Each catalyst support was prepared. The particular crystalline molecular sieve zeolite material, in a finely-divided form, was made into a paste with distilled water and added to a sol of an Aero 1000 alumina (about 10 wt% solids) obtained from the American Cyanamid Company. The composite of zeolite and alumina sol was thoroughly blended, gelled by means of the addition of a 1:1 solution of distilled water and concentrated ammonium hydroxide, dried in air, ground to pass through a 100-mesh screen (Tyler), and extruded to 5/64-inch (0.198-centimeter) extrudates. The extrudates were dried at a temperature of 250° F. (121° C.) for a time within the range of 2 hours to about 16 hours and calcined in air at a temperature of about 1,000° F. (538° C.) for a period of time ranging from at least 1 hour to about 16 hours. In some of the cases, two batches were prepared and combined before the extrudates were made. The calcined extrudates comprised a particular catalyst support. Information related to the preparation of these catalyst supports is presented hereinbelow in Table XVIII.

TABLE XVIII

| | CATALYST SUPPORT PREPARATION | | | | | |
|---|---|---|---|---|---|---|
| Catalyst | L | M | N | O | P | Q |
| Zeolite Material, | USAM | HZSM-5 | HAMS-1B | HEZ-55 | DY | REY |
| gm/batch | 681 | 90 | 90 | — | 90 | 90 |
| Alumina Sol, | 15,890 | 3,600 | 3,600 | — | 3,600 | 3,600 |
| gm/batch | | | | | | |
| No. of Batches | 1 | 2 | 2 | — | 2 | 2 |
| Particle Size of Zeolite, mesh (Tyler) | — | 100 | — | — | 100 | 100 |
| 1:1 NH$_4$OH sol'n., cc | 800 | 250 | 400 | — | 250 | 250 |
| Drying of gel. | | | | | | |
| Time, hr | 16 | 16 | — | — | — | ≈60 |
| Temp., °C. | 121 | 121 | 121 | — | 121 | 121 |
| Particle Size Before Extrusion, mesh (Tyler) | 100 | 100 | 100 | — | 100 | 100 |
| Drying of Extrudate | | | | | | |
| Time, hr | 16 | 16 | —[1] | 16 | 16 | 2 |
| Temp., °C. | 121 | 121 | 121 | 121 | 121 | 121 |
| Calcining of Extrudate | | | | | | |

TABLE XVIII-continued

| | CATALYST SUPPORT PREPARATION | | | | | |
|---|---|---|---|---|---|---|
| Catalyst | L | M | N | O | P | Q |
| Time, hr | 3 | >4 | 16 | ≈2 | >1 | 2 |
| Temp., °C. | 538 | 538 | 538 | 538 | 538 | 538 |
| Extrudate size, cm | 0.198 | 0.198 | 0.198 | 0.198 | 0.198 | 0.198 |
| Molecular Sieve in Support, % | 30 | 20 | 20 | 20 | 20 | 20 |

[1] During mulling for extrusion, $Al_2O_3$ added to aid drying.

The ultrastable, large-pore crystalline aluminosilicate material was obtained as Z-14US molecular sieves from the Davison Chemical Division of W. R. Grace & Co. The Z-14US material, which contained 2.49 wt% sodium, was exchanged with ammonium nitrate solution and washed with distilled water in order to reduce its sodium content. After the cation exchange, the sodium level was 0.13 wt% sodium. This exchanged US molecular sieve is identified herein as USAM.

Prior to its use in a catalyst support, ZSM-5-type molecular sieve material was slurried in distilled water and cation exchanged with ammonium nitrate solution. A 389-gram portion of the ZSM-5 material was slurried in 3,000 milliliters of distilled water and exchanged three times with 202 grams of $(NH_4)(NO_3)$. The material was filtered after each exchange step. The exchanged material was then washed three times by re-slurrying in 3,500 milliliters of distilled water and filtered after each wash. The washed, exchanged material was dried overnight (approximately 16 hours) in air at a temperature of 250° F. (121° C.) and calcined in air for three hours at a temperature of 1,000° F. (538° C.). The calcined material was the hydrogen form of the ZSM-5-type molecular sieve material and is identified herein as HZSM-5. X-ray diffraction analysis indicated that the HZSM-5 material was 84% crystalline material and provided the ZSM-5 X-ray diffraction pattern.

Crystalline AMS-IB borosilicate material was exchanged with ammonium nitrate solution, dried, and calcined to provide the hydrogen form of the material, which is identified herein as HAMS-IB.

The fluid cracking catalyst HEZ-55, which contained a faujasitic zeolitic molecular sieve component, was obtained from the Houdry Corporation. It is identified herein as HEZ-55.

A catalyst support was made with Diuturnal-Y molecular sieves obtained from the Linde Division of Union Carbide Corporation. These sieves are identified hereinafter as DY molecular sieves.

A rare earth metal-exchanged Y-type zeolite was obtained by exchanging 3,000 grams of SK-40 molecular sieves obtained from the Linde Division of Union Carbide Corporation. The SK-40 material was slurried in eight liters of distilled water and the slurry was added to 4,000 grams of rare earth chloride solution (approximately 60% crystals) obtained from the Ventron Division of Alfa Inorganics. The resulting mixture was stirred as it was heated to reflux for a period of about one hour and the solids were allowed to settle thereafter overnight. Subsequently the supernatant liquid (5,500 milliliters) was siphoned off. The solid material was exchanged four times with 4,000 grams of rare earth chloride solution and 3,000 milliliters of water each time. The supernatant liquid (6,200 milliliters) was siphoned off. Then it was exchanged four times with 4,000 grams of rare earth chloride solution and 3,600 milliliters of water each time and the supernatant liquid (6,500 milliliters) was siphoned off. The material was then filtered, dried at a temperature of about 250° F. (121° C.) for a period of 16 hours, and calcined in air for three hours at a temperature of about 1,430° F. (777° C.). The calcined material was again exchanged with rare earth chloride solution three times, using about 2,000 grams of rare earth chloride solution each time and adding 400 grams of ammonium nitrate, $(NH_4)(NO_3)$, during the last exchange. The exchanged material was then washed with distilled water four times, filtered, and filter-cake dried at a temperature of 250° F. (121° C.) overnight (approximately 16 hours). This exchanged, rare earth metal Y zeolite is identified herein as REY.

Each support was impregnated with solutions of metal salts in order to provide a final catalytic composition containing nickel, chromium, and molybdenum as hydrogenating metals. The chromium was added first by means of an aqueous solution of $(NH_4)_2Cr_2O_7$. After the chromium-impregnated material was dried and calcined, it was impregnated either by means of a single solution containing both $Ni(NO_3)_2.6H_2O$ and $(NH_4)_6Mo_7O_{24}.4H_2O$ or by a solution of $(NH_4)_6Mo_7O_{24}.4H_2O$ followed after drying and calcination by a solution of $Ni(NO_3)_2.6H_2O$. Pertinent information and data relating to the impregnation steps for each of these six catalysts are presented hereinbelow in Table XIX.

TABLE XIX

| | CATALYST IMPREGNATION DETAILS | | | | | |
|---|---|---|---|---|---|---|
| Catalyst | L | M | N | O | P | Q |
| Support, gm | 294 | 139 | 294 | 147 | 294 | 143 |
| % molecular sieve | 30 | 20 | 20 | 20 | 20 | 20 |
| Type of molecular sieve | USAM | ZSM-5 | AMS-1B | HEZ-55 | DY | REY |
| First Impregnation Solution | | | | | | |
| $(NH_4)_2Cr_2O_7$, gm | 66.4 | 25.2 | 66.4 | 33.2 | 66.4 | 33.2 |
| Dist. $H_2O$, ml | 300 | 120 | 270 | 100 | 200[3] | |
| Standing | | | | | | |
| Time, hr | 16 | 1 | — | 1 | 1 | 1 |
| Temp., °C. | room | room | — | room | room | room |
| Drying | | | | | | |
| Time, hr | — | — | — | 2 | 16 | 2 |
| Temp., °C. | — | — | — | 121 | 121 | 121 |

TABLE XIX-continued

CATALYST IMPREGNATION DETAILS

| Catalyst | L | M | N | O | P | Q |
|---|---|---|---|---|---|---|
| Calcining | | | | | | |
| Time, hr | 16 | 16 | 16(2) | 16 | >1 | 16 |
| Temp., °C. | 538 | 538 | 538 | 538 | 538 | 538 |
| Second Impregnation Solution | | | | | | |
| $(NH_4)_6Mo_7O_{24}\cdot4H_2O$, gm | 49.04 | 41.46 | 73.6 | 36.8 | 36.8 | 36.8 |
| $Ni(NO_3)_2\cdot6H_2O$, gm | — | 27.07 | — | 27.25 | 11.68 | 27.25 |
| Dist. $H_2O$, ml | 250 | 100 | 200 | 90 | 110 | 90 |
| Standing | | | | | | |
| Time, hr | 6 | — | — | 1 | 1 | 1 |
| Temp., °C. | room | room | room | room | room | room |
| Drying | | | | | | |
| Time, hr | — | — | — | 1.5 | — | 2 |
| Temp., °C. | — | — | — | 121 | — | 121 |
| Calcining | | | | | | |
| Time, hr | 16 | — | ≈60 | 16 | — | 16 |
| Temp., °C. | 538 | 538 | 538 | 538 | — | 538 |
| Third Impregnation Solution | | | | | | |
| $Ni(NO_3)_2\cdot6H_2O$, gm | 11.68 | — | 27.25 | — | 15.57 | — |
| Dist. $H_2O$, ml | 125 | — | 100 | — | 100 | — |
| Support, gm | 182.5 | — | 190 | — | 166 | — |
| Standing | | | | | | |
| Time, hr | 6 | — | — | — | — | — |
| Temp., °C. | room | — | — | — | room | — |
| Calcining | | | | | | |
| Time, hr | 16 | — | — | — | >1 | — |
| Temp., °C. | 538 | — | 538 | — | 538 | — |
| Catalyst size, mesh (Tyler) | 16/20 | 16/20 | 14/20 | 14/20 | 14/20 | 14/20 |

(1)10 ml of 30% $H_2O_2$ added to aid solution of $(NH_4)_6Mo_7O_{24}\cdot4H_2O$.
(2)Excess liquid decanted prior to calcination. Decanted liquid added to calcined material, which was again calcined.
(3)Additional distilled water used to make 250 ml of solution.

Catalysts L, M, N, O, P, and Q were tested for their abilities to hydrotreat the heavy vacuum gas oil Feed No. 3 in Tests Nos. 13, 14, 15, 16, 17, 18, and 19, respectively. The results of these tests are presented hereinbelow in Tables XX, XXI, XXII, XXIII, XXIV, and XXV, respectively.

TABLE XX

DATA FOR TEST NO. 14, CATALYST L, FEED NO. 3

| Days on Stream | 6 | 8 | 13 |
|---|---|---|---|
| LHSV, hr$^{-1}$ | 1.25 | 1.25 | 1.25 |
| Temp., °F. | 740 | 780 | 780 |
| °C. | 393 | 416 | 416 |
| Hydrogen Pressure, psi | 1,200 | 1,200 | 1,200 |
| kPa | 8,343 | 8,343 | 8,343 |
| Hydrogen Rate, SCFB | 13,300 | 14,500 | 14,500 |
| m$^3$/m$^3$ | 2,370 | 2,580 | 2,580 |
| Product Properties | | | |
| Gravity, °API | 26.2 | 31.0 | 29.8 |
| gm/cc | 0.8973 | 0.8708 | 0.8772 |
| Pour Point, °F. | 115 | — | 105 |
| °C. | 46 | — | 41 |
| Viscosity at 100° C., cst | 5.57 | — | 3.11 |
| Carbon, wt % | 87.16 | — | 87.12 |
| Hydrogen, wt % | 12.65 | — | 12.85 |
| Sulfur, ppm | 800 | 113 | 150 |
| Nitrogen, ppm | 483 | 105 | 160 |
| Sim. Dist., °F. (°C.) | | | |
| IBP | 215 (102) | — | 150 (66) |
| 5% | 428 (220) | — | 307 (153) |
| 20% | 617 (325) | — | 533 (279) |
| 50% | 729 (387) | — | 749 (398) |
| 80% | 792 (422) | — | 884 (473) |
| 95% | 818 (437) | — | 969 (521) |
| HDS, % | 97.3 | 99.6 | 99.1 |
| HDN, % | 71.6 | 93.8 | 90.5 |
| Hydrogen Consumed, SCFB | 580 | — | 755 |
| m$^3$/m$^3$ | 103 | — | 134 |

TABLE XX-continued

DATA FOR TEST NO. 14, CATALYST L, FEED NO. 3

| Days on Stream | 6 | 8 | 13 |
|---|---|---|---|
| Product Yield, wt % | | | |
| $C_1$-$C_4$ | 0.4 | — | 1.3 |
| IBP - 182° C. | 3.1 | — | 7.4 |
| 182°-343° C. | 23.1 | — | 25.4 |
| 343° C.+ | 73.3 | — | 65.9 |

TABLE XXI

DATA FOR TEST NO. 15, CATALYST M, FEED NO. 3

| Days on Stream | 8 | 11 | 14 |
|---|---|---|---|
| LHSV, hr$^{-1}$ | 1.25 | 1.25 | 1.25 |
| Temp., °F. | 740 | 780 | 780 |
| °C. | 393 | 416 | 416 |
| Hydrogen Pressure, psi | 1,200 | 1,200 | 1,200 |
| kPa | 8,343 | 8,343 | 8,343 |
| Hydrogen Rate, SCFB | 12,000 | 12,000 | 12,000 |
| m$^3$/m$^3$ | 2,140 | 2,140 | 2,140 |
| Product Properties | | | |
| Gravity, °API | 27.4 | 30.1 | 29.8 |
| gm/cc | 0.8905 | 0.8756 | 0.8772 |
| Pour Point, °F. | 70 | — | −10 |
| °C. | 21.1 | — | −23.3 |
| Viscosity at 100° C., cst | 4.61 | — | 2.80 |
| Carbon, wt % | 87.14 | — | 87.37 |
| Hydrogen, wt % | 12.78 | — | 12.61 |
| Sulfur, ppm | 285 | 74 | 80 |
| Nitrogen, ppm | 475 | 210 | 265 |
| Sim. Dist., °F. (°C.) | | | |
| IBP | 164 (73) | — | 110 (43) |
| 5% | 404 (206) | — | 270 (132) |
| 20% | 652 (344) | — | 534 (279) |
| 50% | 803 (429) | — | 741 (394) |
| 80% | 913 (490) | — | 875 (469) |
| 95% | 995 (535) | — | 961 (517) |
| HDS, % | 99.0 | 99.8 | 99.7 |

TABLE XXI-continued

DATA FOR TEST NO. 15, CATALYST M, FEED NO. 3

| Days on Stream | 8 | 11 | 14 |
|---|---|---|---|
| HDN, % | 72.0 | 87.6 | 84.4 |
| Hydrogen Consumed, SCFB | 690 | — | 630 |
| m³/m³ | 123 | — | 112 |
| Product Yield, wt % | | | |
| C₁-C₄ | 1.1 | — | 3.5 |
| IBP - 182° C. | 4.0 | — | 8.5 |
| 182°-343° C. | 15.5 | — | 23.7 |
| 343° C.+ | 79.3 | — | 64.3 |

TABLE XXII

DATA FOR TEST NO. 16, CATALYST N, FEED NO. 3

| Days on Stream | 1 | 5 | 7 | 11 |
|---|---|---|---|---|
| LHSV, hr⁻¹ | 1.25 | 1.25 | 1.25 | 1.25 |
| Temp., °F. | 740 | 740 | 780 | 780 |
| °C. | 393 | 393 | 416 | 416 |
| Hydrogen Pressure, psi | 1,200 | 1,200 | 1,200 | 1,200 |
| kPa | 8,343 | 8,343 | 8,343 | 8,343 |
| Hydrogen Rate, SCFB | 13,000 | 13,000 | 16,000 | 16,000 |
| m³/m³ | 2,315 | 2,315 | 2,850 | 2,850 |
| Product Properties | | | | |
| Gravity, °API | 28.1 | 27.4 | 30.7 | 29.8 |
| gm/cc | 0.8866 | 0.8905 | 0.8724 | 0.8772 |
| Pour Point, °F. | — | 80 | −10 | −5 |
| °C. | — | 26.7 | — | −20.6 |
| Viscosity at 100° C., cst | — | 4.91 | — | 2.91 |
| Carbon, wt % | — | 87.33 | — | 87.36 |
| Hydrogen, wt % | — | 12.60 | — | 12.61 |
| Sulfur, ppm | 200 | 305 | 56 | 79 |
| Nitrogen, ppm | 256 | 415 | 170 | 210 |
| Sim. Dist., °F. (°C.) | | | | |
| IBP | — | 173 (79) | — | 116 (47) |
| 5% | — | 409 (209) | — | 275 (135) |
| 20% | — | 645 (341) | — | 522 (272) |
| 50% | — | 736 (391) | — | 721 (383) |
| 80% | — | 909 (487) | — | 852 (455) |
| 95% | — | 994 (534) | — | 942 (505) |
| HDS, % | 99.3 | 99.0 | 99.8 | 99.7 |
| HDN, % | 84.9 | 75.6 | 90.0 | 87.6 |
| Hydrogen Consumed, SCFB | — | 555 | — | 610 |
| m³/m³ | — | 99 | — | 109 |
| Product Yield, wt % | | | | |
| C₁-C₄ | — | 0.7 | — | 2.6 |
| IBP - 182° C. | — | 3.5 | — | 8.5 |
| 182°-343° C. | — | 17.1 | — | 26.6 |
| 343° C.+ | — | 78.7 | — | 62.3 |

TABLE XXIII

DATA FOR TEST NO. 17, CATALYST O, FEED NO. 3

| Days on Stream | 3 | 7 | 10 | 12 | 14 | 17 |
|---|---|---|---|---|---|---|
| LHSV, hr⁻¹ | 1.25 | 1.25 | 1.25 | 0.625 | 0.625 | 1.25 |
| Temp., °F. | 740 | 740 | 780 | 780 | 780 | 740 |
| °C. | 393 | 393 | 416 | 416 | 416 | 393 |
| Hydrogen Pressure, psi | 1,200 | 1,200 | 1,200 | 1,200 | 1,200 | 1,200 |
| kPa | 8,343 | 8,343 | 8,343 | 8,343 | 8,343 | 8,343 |
| Hydrogen Rate, SCFB | 12,000 | 12,000 | 12,000 | 12,000 | 12,000 | 12,000 |
| m³/m³ | 2,140 | 2,140 | 2,140 | 2,140 | 2,140 | 2,140 |
| Product Properties | | | | | | |
| Gravity, °API | 27.0 | 26.1 | 30.9 | 36.1 | 37.2 | 27.1 |
| gm/cc | 0.8927 | 0.8978 | 0.8713 | 0.8443 | 0.8388 | 0.8922 |
| Pour Point, °F. | — | 110 | 105 | — | 20 | 100 |
| °C. | — | 43 | 41 | — | −6.7 | 38 |
| Viscosity at 100° C., cst | — | 5.80 | 2.40 | — | Low | 5.90 |
| Carbon, wt % | — | — | 87.16 | — | 86.95 | — |
| Hydrogen, wt % | — | — | 12.80 | — | 13.05 | — |
| Sulfur, ppm | — | 1,050 | 160 | 44 | 49 | 1,460 |
| Nitrogen, ppm | 558 | 603 | 147 | 75 | 30 | 649 |
| Sim. Dist., °F. (°C.) | | | | | | |
| IBP | — | 223 (106) | 170 (77) | — | 132 (55) | 243 (118) |
| 5% | — | 505 (263) | 354 (179) | — | 199 (93) | 537 (281) |
| 20% | — | 702 (372) | 588 (309) | — | 319 (159) | 715 (380) |
| 50% | — | 830 (443) | 769 (409) | — | 521 (272) | 843 (451) |
| 80% | — | 935 (502) | 895 (480) | — | 754 (401) | 959 (515) |
| 95% | — | — (—) | 984 (529) | — | 868 (465) | — (—) |
| HDS, % | — | 96.5 | 99.5 | 99.8 | 99.5 | 95.1 |
| HDN, % | 67.1 | 64.5 | 91.3 | 93.5 | 98.2 | 61.8 |
| Hydrogen Consumed, SCFB | — | 590 | 730 | — | 1,070 | 540 |

TABLE XXIII-continued

DATA FOR TEST NO. 17, CATALYST O, FEED NO. 3

| Days on Stream | 3 | 7 | 10 | 12 | 14 | 17 |
|---|---|---|---|---|---|---|
| $m^3/m^3$ | — | 105 | 130 | — | 190 | 96 |
| Product Yield, wt % | | | | | | |
| $C_1-C_4$ | — | 2.3 | 1.5 | — | 6.5 | 1.4 |
| IBP - 182° C. | — | 1.9 | 5.1 | — | 24.3 | 1.7 |
| 182°-343° C. | — | 11.2 | 22.1 | — | 36.6 | 9.7 |
| 343° C.+ | — | 84.7 | 71.3 | — | 32.5 | 87.3 |

TABLE XXIV

DATA FOR TEST NO. 18, CATALYST P, FEED NO. 3

| Days on Stream | 8 | 13 | 16 | 20 | 23 |
|---|---|---|---|---|---|
| LHSV, hr$^{-1}$ | 1.25 | 0.612 | 1.25 | 0.612 | 1.25 |
| Temp., °F. | 740 | 740 | 780 | 780 | 740 |
| °C. | 393 | 393 | 416 | 416 | 393 |
| Hydrogen Pressure, psi | 1,200 | 1,200 | 1,200 | 1,200 | 1,200 |
| kPa | 8,343 | 8,343 | 8,343 | 8,343 | 8,343 |
| Hydrogen Rate, SCFB | 12,000 | 12,000 | 12,000 | 12,000 | 12,000 |
| $m^3/m^3$ | 2,140 | 2,140 | 2,140 | 2,140 | 2,140 |
| Product Properties | | | | | |
| Gravity, °API | 27.3 | 36.6 | 30.4 | 64.4 | 26.4 |
| gm/cc | 0.8911 | 0.8418 | 0.8740 | 0.7223 | 0.8961 |
| Pour Point, °F. | 110 | 80 | 105 | −60 | 105 |
| °C. | 43 | 26.7 | 41 | −51.1 | 41 |
| Viscosity at 100° C., cst | 5.28 | 1.53 | 2.91 | — | 5.75 |
| Carbon, wt % | 87.06 | 86.61 | 87.08 | 87.26 | 87.01 |
| Hydrogen, wt % | 12.74 | 13.37 | 12.90 | 14.29 | 12.93 |
| Sulfur, ppm | 700 | 184 | 161 | 580 | 1,080 |
| Nitrogen, ppm | 491 | 66 | 105 | 8.6 | 681 |
| Sim. Dist., °F. (°C.) | | | | | |
| IBP | 195 (91) | 126 (52) | 119 (48) | −17 (−27.2) | 254 (123) |
| 5% | 460 (238) | 231 (111) | 279 (137) | 63 (17.2) | 515 (269) |
| 20% | 682 (361) | 367 (186) | 522 (272) | 134 (56) | 701 (372) |
| 50% | 818 (437) | 591 (311) | 749 (398) | 196 (91) | 832 (444) |
| 80% | 920 (493) | 807 (431) | 889 (476) | 255 (124) | 931 (500) |
| 95% | 996 (536) | 873 (468) | 975 (524) | 332 (167) | 1,010 (543) |
| HDS, % | 97.7 | 99.4 | 99.5 | 98.0 | 96.3 |
| HDN, % | 71.1 | 96.1 | 93.8 | 99.4 | 59.6 |
| Hydrogen Consumed, SCFB | 683 | 1,150 | 862 | 2,200 | 780 |
| $m^3/m^3$ | 122 | 205 | 154 | 392 | 139 |
| Product Yield, wt % | | | | | |
| $C_2-C_4$ | 0.7 | 2.8 | 1.7 | 18.0 | 0.6 |
| IBP - 182° C. | 2.7 | 16.5 | 8.4 | 78.7 | 1.7 |
| 182°-343° C. | 13.1 | 39.9 | 25.0 | 2.5 | 11.7 |
| 343° C.+ | 83.5 | 40.8 | 64.9 | 0.8 | 86.0 |

TABLE XXV

DATA FOR TEST NO. 19, CATALYST Q, FEED NO. 3

| Days on Stream | 4 | 7 | 11 | 18 | 21 |
|---|---|---|---|---|---|
| LHSV, hr$^{-1}$ | 1.25 | 1.25 | 0.625 | 0.625 | 1.25 |
| Temp., °F. | 740 | 780 | 780 | 750 | 740 |
| °C. | 393 | 416 | 416 | 399 | 393 |
| Hydrogen Pressure, psi | 1,200 | 1,200 | 1,200 | 1,200 | 1,200 |
| kPa | 8,343 | 8,343 | 8,343 | 8,343 | 8,343 |
| Hydrogen Rate, SCFB | 12,000 | 12,000 | 12,000 | 12,000 | 12,000 |
| $m^3/m^3$ | 2,140 | 2,140 | 2,140 | 2,140 | 2,140 |
| Product Properties | | | | | |
| Gravity, °API | 27.7 | 31.1 | 51.2 | 33.2 | 26.0 |
| gm/cc | 0.8800 | 0.8708 | 0.7720 | 0.8591 | 0.8984 |
| Pour Point, °F. | 90 | 95 | −70 | 85 | 100 |
| °C. | 32.2 | 35 | −56.7 | 29.4 | 38 |
| Viscosity at 100° C., cst | 5.68 | 2.85 | 0.82 | 1.90 | 5.81 |
| Carbon, wt % | 86.97 | 87.18 | 86.09 | 87.06 | 82.11 |
| Hydrogen, wt % | 12.90 | 12.78 | 13.89 | 12.93 | 12.68 |
| Sulfur, ppm | 810 | 190 | 254 | 52 | 1,270 |
| Nitrogen, ppm | 535 | 123 | 1.6 | 22 | 800 |
| Sim. Dist., °F. (°C.) | | | | | |
| IBP | 295 (146) | 117 (47) | −29 (−33.9) | 117 (47) | 104 (40) |
| 5% | 510 (266) | 284 (140) | 115 (46) | 242 (117) | 270 (132) |
| 20% | 688 (365) | 525 (274) | 199 (93) | 438 (226) | 582 (305) |
| 50% | 817 (436) | 747 (397) | 295 (146) | 653 (345) | 998 (537) |
| 80% | 917 (492) | 886 (475) | 415 (213) | 842 (450) | 930 (499) |
| 95% | 994 (534) | 971 (522) | 536 (280) | 945 (507) | — (—) |

TABLE XXV-continued

| | DATA FOR TEST NO. 19, CATALYST Q; FEED NO. 3 | | | | |
|---|---|---|---|---|---|
| Days on Stream | 4 | 7 | 11 | 18 | 21 |
| HDS, % | — | — | — | — | — |
| HDN, % | 68.5 | 92.7 | 99.9 | 98.7 | 52.3 |
| Hydrogen Consumed, SCFB | 762 | 726 | 1,720 | 860 | 610 |
| $m^3/m^3$ | 136 | 129 | 306 | 153 | 109 |
| Product Yield, wt % | | | | | |
| $C_1-C_4$ | 0.6 | 1.6 | 9.7 | 2.9 | 0.5 |
| IBP - 182° C. | 1.3 | 8.2 | 61.2 | 12.4 | 8.6 |
| 182°-343° C. | 13.3 | 24.6 | 28.5 | 35.7 | 17.6 |
| 343° C.⁻ | 84.8 | 65.6 | 0.6 | 49.0 | 73.2 |

The conversion data obtained with Catalysts J, L, M, N, O, P, and Q and presented in Tables XV, XVI, and XX through XXV are summarized hereinbelow in Tables XXVI and XXVII.

TABLE XXVI

SUMMARY OF CONVERSION DATA AT 740° F. (393° C.)

| Catalyst | J | | | | J | L | M | N | O | | P | | P | |
|---|---|---|---|---|---|---|---|---|---|---|---|---|---|---|
| Molecular Sieve | NONE | | | | NONE | USAM | HZSM-5 | HAMS-1B | HEZ-55 | | DY | | DY | |
| Days on Stream | 4 | 14 | 21 | A | 5 | 6 | 8 | 5 | 7 | 17 | 8 | 23 | A | 13 |
| LHSV, $hr^{-1}$ | 0.625 | 0.625 | 0.625 | 0.625 | 1.25 | 1.25 | 1.25 | 1.25 | 1.25 | 1.25 | 1.25 | 1.25 | 1.25 | 0.612 |
| $C_1-C_4$, wt % | 0.9 | 0.7 | 0.9 | 0.8 | 0.6 | 0.4 | 1.1 | 0.7 | 2.3 | 1.4 | 1.9 | 0.7 | 0.6 | 2.8 |
| IBP - 182° C., wt % | 0.3 | 1.8 | 2.1 | 1.4 | 0.3 | 3.1 | 4.0 | 3.5 | 1.9 | 1.7 | 1.8 | 2.7 | 1.7 | 16.5 |
| 182°-343° C., wt % | 20.2 | 16.5 | 15.4 | 17.4 | 15.6 | 23.1 | 15.5 | 17.1 | 11.2 | 9.7 | 10.5 | 13.1 | 11.7 | 39.9 |
| 343° C.⁺, wt % | 78.6 | 81.0 | 81.5 | 80.3 | 83.5 | 73.3 | 79.3 | 78.7 | 84.7 | 87.3 | 86.0 | 83.5 | 86.0 | 40.8 |

| Catalyst | $Q^{(1)}$ | Q | | |
|---|---|---|---|---|
| Molecular Sieve | Rey | Rey | | |
| Days on Stream | 18 | 4 | 21 | A |
| LHSV, $hr^{-1}$ | 0.625 | 1.25 | 1.25 | 1.25 |
| $C_1-C_4$, wt % | 2.9 | 0.6 | 0.5 | 0.6 |
| IBP - 182° C., wt % | | 12.4 | 1.3 | 8.6 5.0 |
| 182°-343° C., wt % | 35.7 | 13.3 | 17.6 | 15.5 |
| 343° C.⁺, wt % | 49.0 | 84.8 | 73.2 | 79.0 |

A = Arithmetic average of values shown
$^{(1)}$ = at 750° F. (399° C.)

TABLE XXVII

SUMMARY OF CONVERSION DATA AT 780° F. (416° C.)

| Catalyst | J | J | L | M | N | O | O | P | P | Q | Q |
|---|---|---|---|---|---|---|---|---|---|---|---|
| Molecular Sieve | NONE | NONE | USAM | HZSM-5 | HAMS-1B | HEZ-55 | HEZ-55 | DY | DY | REY | REY |
| Days on Stream | 11 | 8 12 A | 13 | 14 | 11 | 14 | 10 | 20 | 16 | 11 | 7 |
| LHSV, $hr^{-1}$ | 0.625 | 1.25 1.25 1.25 | 1.25 | 1.25 | 1.25 | 0.625 | 1.25 | 0.612 | 1.25 | 0.625 | 1.25 |
| $C_1-C_4$, wt % | 2.2 | 0.6 1.4 1.0 | 1.3 | 3.5 | 2.6 | 6.5 | 1.5 | 18.0 | 1.7 | 9.7 | 1.6 |
| IBP - 182° C., wt % | 3.4 | 1.2 4.1 2.7 | 7.4 | 8.5 | 8.5 | 24.3 | 5.1 | 78.7 | 8.4 | 61.2 | 8.2 |
| 182°-343° C., wt % | 31.3 | 13.7 28.2 21.0 | 25.4 | 23.7 | 26.6 | 36.6 | 22.1 | 2.5 | 25.0 | 28.5 | 24.6 |
| 343° C.⁺, wt % | 63.1 | 84.5 66.3 75.4 | 65.9 | 64.3 | 62.3 | 32.5 | 71.3 | 0.8 | 64.9 | 0.6 | 65.6 |

A = Arithmetic average of values shown

In each of these last two tables, where more than one set of values is presented for a catalyst at the specified conditions, an arithmetic average of the values for each particular product component is presented and this arithmetic average is considered hereinafter the amount of that product component for that specified catalyst at the specified conditions.

Examination of the data in Tables XXVI and XXVII reveals that each catalyst containing a crystalline molecular sieve zeolite component at either value of LHSV and a temperature of 780° F. (416° C.) provides a conversion of the hydrocarbon stream to lighter materials that is greater than that furnished by the catalyst that has a support of only alumina and that does not contain a crystalline molecular sieve zeolite. At a temperature of 740° F. (393° C.) and an LHSV of 0.625 $hr^{-1}$, all those catalysts containing a molecular sieve zeolite component that were tested at this value of LHSV provided conversions that were greater than the conversion furnished by the catalyst that did not contain a crystalline molecular sieve zeolite. Furthermore, in the case of the higher LHSV and the lower temperature, the catalysts containing ultrastable, large-pore crystalline aluminosilicate material, ZSM-5-type crystalline aluminosilicates, AMS-1B crystalline borosilicates, or rare earth metal-exchanged crystalline Y-type aluminosilicates all tend to provide a somewhat higher conversion than the conversion furnished by the catalyst that does not contain a crystalline molecular sieve zeolite component.

As shown by the data in Tables XX, XXI, XXII, XXIII, XXIV, and XXV, each of Catalysts L, M, N, O, P, and Q is an effective catalyst for the process of the present invention for hydrotreating a heavy hydrocarbon stream containing a substantial amount of nitrogen compound to provide motor fuel components, heater oil components, and a feedstock for a catalytic cracking unit. Both nitrogen levels and sulfur levels that are acceptable for a catalytic cracker feed were obtained.

The tests involving Catalysts J, L, M, N, O, P, and Q demonstrate the embodiment of the process of the present invention wherein a heavy hydrocarbon stream containing a substantial amount of nitrogen compounds is hydrodenitrogenated and hydrocracked to provide motor fuel components, heater oil components, and a feedstock that is suitable for a catalytic cracking unit.

What is claimed is:

1. A process for the hydrodenitrogenation and hydrocracking of a hydrocarbon stream containing a substantial amount of nitrogen compounds, which process comprises contacting said stream in a reaction zone under hydrodenitrogenation and hydrocracking conditions and in the presence of hydrogen with a catalyst comprising a hydrogenation component comprising chromium, molybdenum, and at least one Group VIII metal, a crystalline molecular sieve zeolite selected from the group consisting of ZSM crystalline aluminosilicate and AMS crystalline metallosilicate and containing exchangeable cations, and a porous refractory inorganic oxide, the metals of said hydrogenation component being present in the elemental form as oxides, as sulfides, or mixtures thereof, said stream being selected from the group consisting of petroleum hydrocarbon distillates, liquids derived from coal, liquids derived from tar sands, and whole shale oil or any fraction of shale oil.

2. The process of claim 1, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate of hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

3. A process for the hydrodenitrogenation and hydrocracking of a hydrocarbon stream containing a substantial amount of nitrogen compounds, which process comprises contacting said stream in a reaction zone under hydrodenitrogenation and hydrocracking conditions and in the presence of hydrogen with a catalyst comprising a hydrogenation component comprising chromium, molybdenum, and at least one Group VIII metal deposed upon a support comprising a crystalline molecular sieve zeolite selected from the group consisting of a ZSM-5 crystalline aluminosilicate and an AMS-1B crystalline borosilicate suspended in and distributed throughout a matrix of a refractory inorganic oxide support material, the metals of said hydrogenation component being present in the elemental form as oxides, as sulfides, or mixtures thereof, said stream being selected from the group consisting of petroleum hydrocarbon distillates, liquids derived from coal, liquids derived from tar sands, and whole shale oil or any fraction of shale oil.

4. The process of claim 3, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

5. The process of claim 3, wherein said refractory inorganic oxide support material is an alumina, said metal of Group VIII is present in an amount within the range of about 0.5 wt% to about 10 wt%, calculated as the oxide of the metal, said molybdenum is present in an amount within the range of about 5 wt% to about 25 wt%, calculated as MoO$_3$, and said chromium is present in an amount within the range of about 3 wt% to about 15 wt%, calculated as Cr$_2$O$_3$, each amount being based upon the weight of said catalyst, and said molecular sieve zeolite is present in an amount within the range of about 5 wt% to about 90 wt%, based upon the weight of said support.

6. The process of claim 5, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

7. The process of claim 5, wherein said Group VIII metal of said catalyst is cobalt or nickel and said crystalline molecular sieve zeolite of said catalyst is an AMS-1B crystalline borosilicate.

8. The process of claim 7, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

9. A process for the hydrodenitrogenation and hydrocracking of a hydrocarbon stream comprising whole shale oil or any fraction thereof to produce jet fuel components, which process comprises contacting said stream in a reaction zone under hydrodenitrogenation and hydrocracking conditions and in the presence of hydrogen with a catalyst comprising a hydrogenation component comprising chromium, molybdenum, and at least one Group VIII metal, a crystalline molecular sieve zeolite selected from the group consisting of ZSM crystalline aluminosilicate and AMS crystalline metallosilicate and containing exchangeable cations, and a porous refractory inorganic oxide, the metals of said hydrogenation component being present in the elemental form as oxides, as sulfides, or mixtures thereof.

10. The process of claim 9, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

11. The process of claim 9, wherein said crystalline molecular sieve zeolite of said catalyst is an AMS crystalline metallosilicate.

12. The process of claim 11, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

13. A process for the hydrodenitrogenation and hydrocracking of a hydrocarbon stream comprising whole shale oil or any fraction thereof to produce jet fuel components, which process comprises contacting said stream in a reaction zone under hydrodenitrogenation and hydrocracking conditions and in the presence of hydrogen with a catalyst comprising a hydrogenation component comprising chromium, molybdenum, and at least one Group VIII metal deposed upon a support comprising a crystalline molecular sieve zeolite selected from the group consisting of a ZSM-5 crystalline aluminosilicate and an AMS-1B crystalline borosilicate suspended in and distributed throughout a matrix of a high-surface area refractory inorganic oxide support material, the metals of said hydrogenation component being present in the elemental form as oxides, as sulfides, or mixtures thereof.

14. The process of claim 13, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

15. A process for the hydrodenitrogenation and hydrocracking of a whole shale oil or any fraction thereof to produce jet fuel components, which process comprises contacting said stream in a reaction zone under dehydrodenitrogenation and hydrocracking conditions and in the presence of hydrogen with a catalyst comprising a hydrogenation component comprising chromium, molybdenum, and at least one Group VIII metal deposed upon a support comprising a crystalline molecular sieve zeolite selected from the group consisting of a ZSM-5 crystalline aluminosilicate and an AMS-1B crystalline borosilicate suspended in and distributed throughout a matrix of an alumina, the metals of said hydrogenation component being present in the elemental form as oxides, as sulfides, or mixtures thereof, said metal of Group VIII being present in an amount within the range of about 0.5 wt% to about 10 wt%, calculated as the oxide of the metal, said molybdenum being present in an amount within the range of about 5 wt% to about 25 wt%, calculated as MoO$_3$, and said chromium being present in an amount within the range of about 3 wt% to about 15 wt%, calculated as Cr$_2$O$_3$, each amount being based upon the weight of said catalyst, and said molecular sieve zeolite being present in an amount within the range of about 5 wt% to about 90 wt%, based upon the weight of said support.

16. The process of claim 15, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

17. The process of claim 15, wherein said conditions comprise a temperature within the range of about 740° F. (393° C.) to about 790° F. (416° C.), a hydrogen partial pressure within the range of about 1,600 psi (11,024 kPa) to about 2,000 psi (13,780 kPa), an LHSV within the range of about 0.3 volume of hydrocarbon per hour per volume of catalyst to about 2 volumes of hydrocarbon per hour per volume of catalyst, a hydrogen addition rate or hydrogen recycle rate within the range of about 6,000 SCFB (1,079 m$^3$/m$^3$) to about 14,000 SCFB (2,517 m$^3$/m$^3$), and a hydrogen-to-hydrocarbon molar ratio within the range of about 10 moles of hydrogen per mole of hydrocarbon to about 30 moles of hydrogen per mole of hydrocarbon.

18. The process of claim 15, wherein said metal of Group VIII of said catalyst is cobalt or nickel.

19. The process of claim 18, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

20. The process of claim 18, wherein said crystalline molecular sieve zeolite of said catalyst is a ZSM-5 crystalline aluminosilicate.

21. The process of claim 20, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

22. The process of claim 18, wherein said crystalline molecular sieve zeolite of said catalyst is an AMS-1B crystalline borosilicate.

23. The process of claim 22, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

24. A process for the hydrodenitrogenation and hydrocracking of a petroleum hydrocarbon distillate containing a substantial amount of nitrogen compounds to produce motor fuel components, heater oil components, and a hydrocarbon stream that is a suitable feedstock for a catalytic cracking unit, said distillate comprising heavy vacuum gas oils, light virgin gas oils, heavy coker gas oils, full-range gas oils, or mixtures thereof, which process comprises contacting said distillate in a reaction zone under hydrodenitrogenation and hydrocracking conditions and in the presence of hydrogen with a catalyst comprising a hydrogenation component comprising chromium, molybdenum, and at least one Group VIII metal deposed upon a support comprising a crystalline molecular sieve zeolite selected from the group consisting of a HAMS-1B crystalline borosilicate and a HZSM-5 crystalline aluminosilicate suspended in and distributed throughout a matrix of a catalytically active alumina, the metals of said hydrogenation component being present in the elemental form, as oxides, as sulfides, or mixtures thereof, said metal of Group VIII being present in an amount within the range of about 0.5 wt% to about 10 wt%, calculated as the oxide of the metal, said molybdenum being present in an amount within the range of about 5 wt% to about 25 wt%, calculated as MoO$_3$, and said chromium being present in an amount within the range of about 3 wt% to about 15wt%, calculated as Cr$_2$O$_3$, each amount being based upon the weight of said catalyst, and said molecular sieve zeolite being present in an amount within the range of about 5 wt% to about 90 wt%, based upon the weight of said support.

25. The process of claim 24, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

26. The process of claim 24, wherein said conditions comprise a temperature within the range of about 740° F. (393° C.) to about 790° F. (416° C.), a hydrogen partial pressure within the range of about 1,600 psi (11,024 kPa) to about 2,000 psi (13,780 kPa), an LHSV within the range of about 0.3 volume of hydrocarbon per hour per volume of catalyst to about 2 volumes of hydrocarbon per hour per volume of catalyst, a hydrogen addition rate or hydrogen recycle rate within the range of about 6,000 SCFB (1,079 m$^3$/m$^3$) to about 14,000 SCFB (2,517 m$^3$/m$^3$), and a hydrogen-to-hydrocarbon molar ratio within the range of about 10 moles of hydrogen per mole of hydrocarbon to about 30 moles of hydrogen per mole of hydrocarbon.

27. The process of claims 24, wherein said Group VIII metal of said catalyst is nickel.

28. The process of claim 27, wherein said conditions comprise a temperature within the range of about 700° F. (371° C.) to about 800° F. (427° C.), a pressure within the range of about 1,000 psi (6,890 kPa) to about 2,500 psi (17,225 kPa), and LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

29. The process of claims 24, wherein said Group VIII metal of said catalyst is cobalt.

30. The process of claim 29, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate of hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

31. The process of claim 24, wherein said crystalline molecular sieve zeolite is a HAMS-1B crystalline borosilicate.

32. The process of claim 31, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

33. The process of claim 31, wherein said distillate is a heavy vacuum gas oil.

34. The process of claim 33, wherein said conditions comprise a temperature within the range of about 740° F. (393° C.) to about 790° F. (416° C.), a hydrogen partial pressure within the range of about 1,600 psi (11,024 kPa) to about 2,000 psi (13,780 kPa), an LHSV within the range of about 0.3 volume of hydrocarbon per hour per volume of catalyst to about 2 volumes of hydrocarbon per hour per volume of catalyst, a hydrogen addition rate or hydrogen recycle rate within the range of about 6,000 SCFB (1,079 m$^3$/m$^3$) to about 14,000 SCFB (2,517 m$^3$/m$^3$), and a hydrogen-to-hydrocarbon molar ratio within the range of about 10 moles of hydrogen per mole of hydrocarbon to about 30 moles of hydrogen per mole of hydrocarbon.

35. The process of claim 24, wherein said crystalline molecular sieve zeolite is an HZSM-5 crystalline aluminosilicate.

36. The process of claim 35, wherein said distillate is a heavy vacuum gas oil.

37. The process of claim 36, wherein said conditions comprise a temperature within the range of about 700° F. (371° C.) to about 800° F. (427° C.), a pressure within the range of about 1,000 psi (6,890 kPa) to about 2,500 psi (17,225 kPa), an LHSV within the range of about 0.1 volume of hydrocarbon per hour per volume of catalyst to about 5 volumes of hydrocarbon per hour per volume of catalyst, a hydrogen addition rate or hydrogen recycle rate within the range of about 2,000 SCFB (359 m$^3$/m$^3$) to about 20,000 SCFB (3,596 m$^3$/m$^3$), and a hydrogen-to-hydrocarbon molar ratio within the range of about 3 moles of hydrogen per mole of hydrocarbon to about 60 moles of hydrogen per mole of hydrocarbon.

* * * * *